US011676066B2

(12) United States Patent
Sarkar

(10) Patent No.: US 11,676,066 B2
(45) Date of Patent: Jun. 13, 2023

(54) PARALLEL MODEL DEPLOYMENT FOR ARTIFICIAL INTELLIGENCE USING A PRIMARY STORAGE SYSTEM

(71) Applicant: Western Digital Technologies, Inc., San Jose, CA (US)

(72) Inventor: Sanhita Sarkar, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 652 days.

(21) Appl. No.: 16/746,381

(22) Filed: Jan. 17, 2020

(65) Prior Publication Data

US 2021/0224684 A1   Jul. 22, 2021

(51) Int. Cl.
| | | |
|---|---|---|
| *G06F 7/00* | (2006.01) | |
| *G06N 20/00* | (2019.01) | |
| *G06F 9/38* | (2018.01) | |
| *G06F 16/907* | (2019.01) | |
| *G06F 3/06* | (2006.01) | |
| *G06N 5/04* | (2023.01) | |
| *G06N 5/046* | (2023.01) | |

(52) U.S. Cl.
CPC ............. *G06N 20/00* (2019.01); *G06F 3/067* (2013.01); *G06F 3/0607* (2013.01); *G06F 3/0655* (2013.01); *G06F 3/0679* (2013.01); *G06F 9/3877* (2013.01); *G06F 16/907* (2019.01); *G06N 5/04* (2013.01); *G06N 5/046* (2013.01)

(58) Field of Classification Search
CPC .. G06F 16/907; G06F 16/9532; G06F 16/953; G06F 16/9535; G06F 16/28; G06F 3/0607; G06F 3/0655; G06F 3/067; G06F 3/0679; G06F 9/3877; G06N 20/00; G06N 5/04; G06N 5/046
See application file for complete search history.

(56) References Cited

U.S. PATENT DOCUMENTS

| | | | | |
|---|---|---|---|---|
| 11,360,689 | B1 * | 6/2022 | Grunwald | ........... G06F 16/1844 |
| 2003/0100972 | A1 * | 5/2003 | Andersh | ................... G06F 8/36 |
| | | | | 700/121 |
| 2017/0085509 | A1 * | 3/2017 | Fernandez | ............ H04L 51/046 |
| 2019/0026189 | A1 * | 1/2019 | Kim | ......................... G06F 16/21 |
| 2019/0354809 | A1 * | 11/2019 | Ralhan | ................... G06Q 90/00 |
| 2019/0361697 | A1 | 11/2019 | Hu et al. | |

\* cited by examiner

*Primary Examiner* — Mohammad A Sana
(74) *Attorney, Agent, or Firm* — Patent Law Works LLP

(57) ABSTRACT

Example artificial intelligence systems and methods provide parallel storage of data to primary storage and notification to a model server supported by the primary storage. A primary storage system receives operations on a training data set from a model trainer and sends a model instance of a computational model to a model server. When a new data element is received by a data ingester, the model server is initiated to evaluate the new data element using the model instance while the primary storage system stores the new data element in parallel.

20 Claims, 9 Drawing Sheets

PARALLEL MODEL DEPLOYMENT FOR ARTIFICIAL INTELLIGENCE USING A PRIMARY STORAGE SYSTEM

TECHNICAL FIELD

The present disclosure generally relates to data storage, and in a more particular example, to storage systems supporting iterative computational models, such as artificial intelligence and deep learning frameworks.

BACKGROUND

Artificial intelligence (AI) may require processing power and adequate storage while executing various deep learning (DL) frameworks. The training and deployment stages of a DL system have different data processing needs. On one hand, the large volumes of data during training demands systems with support for massive storage capacity, multiple data formats and protocols for processing dispersed data sets, and sharing of data and models across applications. On the other hand, AI deployment for delivering inference on incoming data requires fast access to the data to meet the demand for AI responsiveness for applications. The needs for processing and storage vary for the different phases of an AI data pipeline comprising data ingestion, model training, and model serving for inference, which may be followed by search, analysis, visualization, and other methods of data discovery.

Large-scale distributed storage systems, such as distributed, rack-scale all-flash storage systems with non-volatile memory express (NVMe) connectivity, may be configured to support the data needs of AI systems. In some configurations, storage systems may be deployed as cloud-based storage systems that provide a storage application for supporting one or more phases of the data pipeline. The various stages of AI data ingest, preparation, training, serving, and inference-driven applications may be configured on separate servers, often supported by their own storage systems, and provide various application programming interfaces (APIs) and related protocols for network communication among them.

However, the different storage and processing needs of the various phases of AI data ingestion, model training, model serving, and subsequent use of inferences may present challenges for communication and coordination among the phases and subsystems responsible for them. In production environments, new data may be received by a model server for generating inferences. That new data may also need to be added to the raw data used for future model training. In some cases, new data may also surface flaws in the current model and provide a basis for initiating retraining.

When using distributed storage systems to support AI data storage, it may be advantageous to configure a primary storage system to support multiple phases of AI data use and enable specialized, scalable, and/or reconfigurable processing system to handle the various phases. A need exists for an AI data pipeline that enables parallel storage to a primary storage system and model deployment for real-time inference processing. For example, storage systems that receive new data for AI processing and initiate both storage that supports multiple processing phases and notification to the model server for immediate inference processing may be needed.

SUMMARY

Various aspects for using a primary storage system to support an AI data pipeline, particularly, using parallel storage to the primary storage system and notification to the model server for immediate inference processing are described.

One general aspect includes One general aspect includes a system including: a primary storage system; a data ingester configured to receive raw data for processing through a computational model; a model trainer configured to operate on a training data set in the primary storage system to generate a model instance of the computational model; a model server configured to deploy the model instance of the computational model for use by a client system; and a notifier configured to determine a new data element received by the data ingester, and initiate, in parallel with the primary storage system storing the new data element, the model server to evaluate the new data element using the model instance of the computational model.

Implementations may include one or more of the following features. The system may include a graphical processing unit, where the model trainer is instantiated in the graphical processing unit for operation on the training data set in the primary storage system. The system may include a data preparer configured to: receive the raw data from the data ingester; prepare the training data set from aggregate raw data; and store the training data set to the primary storage system. The model trainer may be further configured to: apply an artificial intelligence framework to the training data set to generate the model instance of the computational model; apply a validation data set stored in the primary storage system to measure a reliability value of the model instance; initiate, responsive to the reliability value not meeting a model validity threshold, retraining of the computational model; and store, responsive to the reliability value meeting the model validity threshold, the model instance of the computational model in the primary storage system. The primary storage system may store aggregate raw data. The system may include a secondary storage system configured to archive archival model instances. The model trainer may be further configured to generate a plurality of model instances over time. The primary storage system may be further configured to: store active model instances for use by the model server; and send archival model instances and related training data sets to the secondary storage system. The system may include an inference evaluator configured to: evaluate an inference score for the new data element, where the model server is further configured to determine the inference score based on the model instance of the computational model; and initiate, responsive to the inference score not meeting a model validity threshold, retraining by the model trainer using a new training data set that includes the new data element. The model server may be further configured to generate metadata for the new data element based on the model instance of the computational model. The inference evaluator may be further configured to initiate, responsive to the inference score meeting the model validity threshold, post-processing of the metadata. The system may include: a metadata store configured to aggregate the metadata generated by the model server; and at least one application configured to use the metadata store to analyze aggregate application of the computational model. The primary storage system may be configured as a cloud storage system including rack-scale all-flash storage. The data ingester may be further configured to store the raw data into at least one data object stored in the cloud storage system. The notifier may be configured as a service running on the cloud storage system.

Another general aspect includes a method that includes: receiving, by a primary storage system, operations on a training data set from a model trainer; sending, by the primary storage system, a model instance of a computational model to a model server; determining a new data element is received by a data ingester; and initiating, in parallel with the primary storage system storing the new data element, the model server to evaluate the new data element using the model instance of the computational model.

Implementations may include one or more of the following features. The method where the model trainer is instantiated in a graphical processing unit for generating the model instance using the training data set stored in the primary storage system. The method may include: receiving, by a data preparer, raw data from the data ingester; preparing, by the data preparer, the training data set from aggregate raw data; and storing, in the primary storage system, the training data set. The method may include: applying, by the model trainer, an artificial intelligence framework to the training data set; generating, by the model trainer, the model instance of the computational model; applying, by the model trainer, a validation data set stored in the primary storage system to measure a reliability value of the model instance; initiating, responsive to the reliability value not meeting a model validity threshold, retraining of the computational model; and storing, responsive to the reliability value meeting the model validity threshold, the model instance of the computational model in the primary storage system. The method may include storing, in the primary storage system, aggregate raw data from the data ingester. The method may include: receiving, from the model trainer, a plurality of model instances over time; storing, in the primary storage system, active model instances for use by the model server; and sending, by the primary storage system, archival model instances and related training data sets to a secondary storage system. The method may include: determining, by the model server, an inference score based on the model instance of the computational model; evaluating the inference score for the new data element; and initiating, responsive to the inference score not meeting a model validity threshold, retraining by the model trainer using a new training data set that includes the new data element. The method may include: generating, by the model server, metadata for the new data element based on the model instance of the computational model; and initiating, responsive to the inference score meeting the model validity threshold, post-processing of the metadata. The method may include: aggregating the metadata generated by the model server in a metadata store; and using the metadata store to analyze aggregate application of the computational model.

Another general aspect includes: a primary storage system configured to store raw data, a training data set, and a model instance of a computational model; means for receiving the raw data for processing through the computational model; means for generating the model instance of the computational model based on the training data set; means for deploying the model instance of the computational model for use by a client system; means for determining a new data element is received for the primary storage system; and means for initiating, in parallel with the primary storage system storing the new data element, the means for deploying the model instance to evaluate the new data element using the model instance of the computational model.

The various embodiments advantageously apply the teachings of artificial intelligence systems utilizing distributed storage networks and/or systems to improve the functionality of such computer systems. The various embodiments include operations to overcome or at least reduce the issues in the previous artificial intelligence computing systems discussed above and, accordingly, are more reliable and/or efficient than other computing networks. That is, the various embodiments disclosed herein include hardware and/or software with functionality to improve the use of storage and processing resources by using parallel storage to the primary storage system and notification to the model server for immediate inference processing. Accordingly, the embodiments disclosed herein provide various improvements to storage networks and/or storage systems, particularly for AI computing systems.

It should be understood that language used in the present disclosure has been principally selected for readability and instructional purposes, and not to limit the scope of the subject matter disclosed herein.

DETAILED DESCRIPTION

An artificial intelligence (AI) computing system may be configured on one or more distributed computing systems to provide computer processing and storage for the difference phases of an AI data pipeline comprising data ingestion, model training, and model serving for inferences provided to client systems for use, search, and data discovery. Some traditional architectures may collocate storage resources, such as flash storage, with model training processors, such as graphical processing units (GPUs) or central processing units (CPUs). A disaggregated architecture that separates the model training processors (and/or other processor-intensive functions) from the storage resources on which those processors operate may be advantageous to improve resource efficiency, flexibility, and scalability.

For example, GPUs or other specialized or general processors may be disaggregated from flash and high capacity storage to enable the delivery of rapid response times and scaling requirements of an AI data pipeline, without compromising data persistence, quality, durability, and the total cost of ownership in the data center. For disaggregated implementations, the AI data pipeline may use a pool of GPU compute resources, a shared pool of NVMe flash storage, and a high capacity persistent storage, such that the resources can scale as needed. Once data is ingested and completes the preparatory phase, the training data can be stored on the shared flash storage and is accessible by the pool of GPUs throughout the AI model training phase, without the need of subsequent data transfers.

The inference delivered by the AI model server is in near-real-time, due to immediate access to the trained models on the shared storage system. New data arrival notifications, as data is ingested in real-time, allow the AI model server to immediately process the new data from its shared storage location through the trained models to generate inferences and custom metadata extraction. Use of inferences by client systems, as well as aggregate inference data for search, analysis, and visualization may proceed immediately. Once the models are trained and stored in the shared storage system, the metadata extraction, search, discovery, and other uses may also occur in near-real-time on incoming data. Unacceptable inference results for new types of data sets may also be identified in real-time to initiate retraining and prevent unacceptable inferences from being added to aggregate inference data used for other applications.

Figure 1:
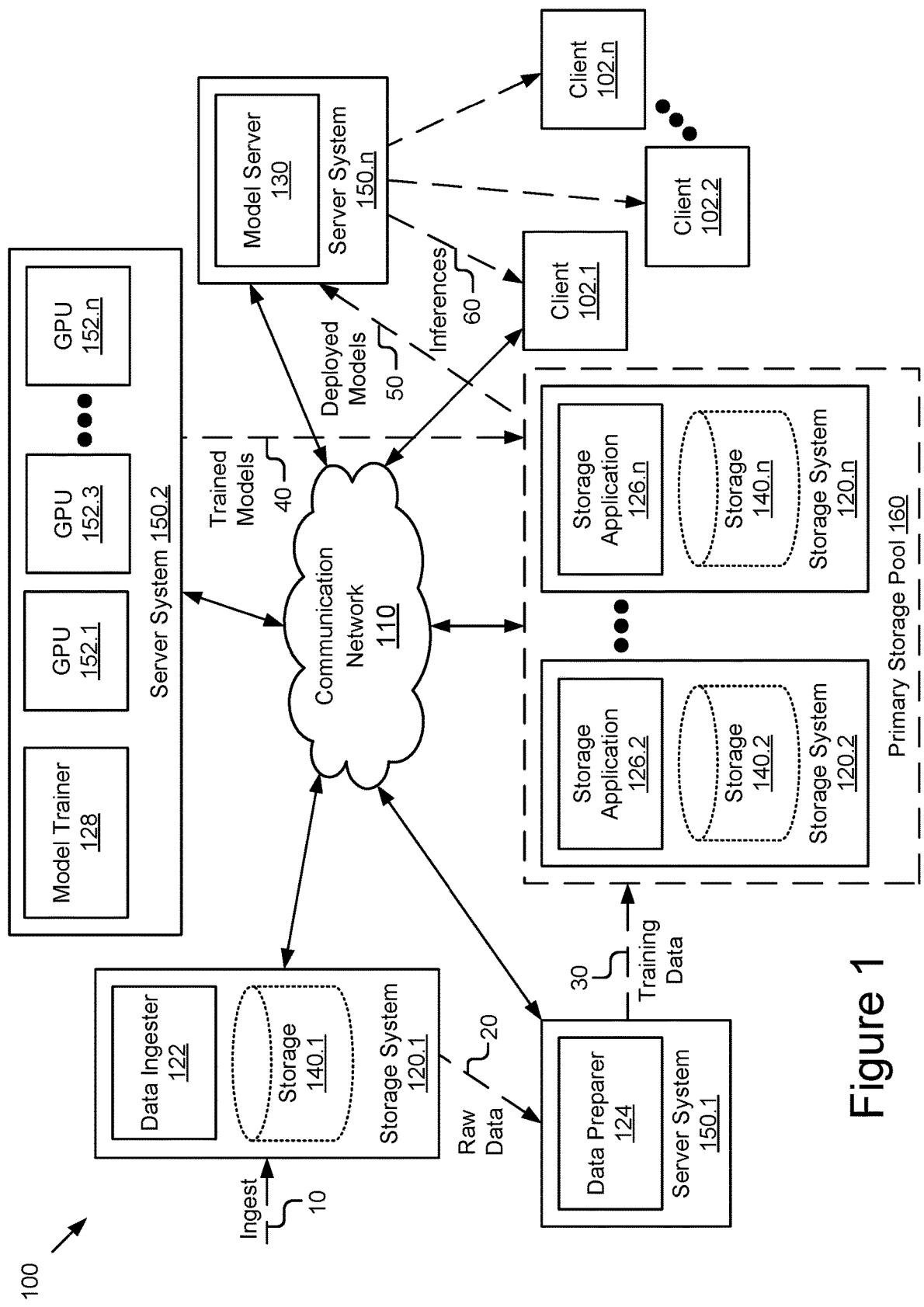
FIG. 1 schematically illustrates an example of a distributed computing system configured for data ingestion, model training, and model serving to client systems.

FIG. 1 illustrates a block diagram of an example distributed computing system 100 configured for data ingestion, model training, and model serving to client systems. System 100 may be configured as an AI computing system that manages an AI data pipeline through the various phases of AI processing and deployment. For example, data may be ingested 10 by data ingester 122. Raw data 20 may be passed to data preparer 124. In some embodiments, raw data 20 may be stored to primary storage pool 160 for retrieval by data preparer 124. Training data 30 may be prepared by data preparer 124 and stored to primary storage pool 160. Model trainer 128 may operate on training data stored in primary storage pool 160 to generate trained models 40 and store them to primary storage pool 160. Trained models may then be deployed as deployed models 50 by model server 130 to generate inferences 60 for client systems 102.

As shown, the system 100 includes client systems 102 (e.g., client systems 102.1, 102.2 . . . 102.n), distributed storage systems 120.1, 120.2 . . . 120.n, data stores 140.1, 140.2 . . . 140.n associated with the distributed storage systems, and server systems 150 (e.g., server systems 150.1, 150.2 . . . 150.n). The components 102, 120, and/or 150, and/or their sub-components, may be interconnected directly or via a communication network 110. For simplicity in some cases, depending on context, client systems 102.1 . . . 102.n may also be referred to herein individually or collectively as client systems 102 or clients 102, distributed storage systems 120.1, 120.2 . . . 120.n may be referred to herein individually or collectively as storage systems 120 or DSS 120, storage applications 126.2 . . . 126.n may be referred to herein individually or collectively as storage applications 126, data stores 140.1, 140.2 . . . 140.n may be referred to herein individually or collectively as data stores 140, server systems 150.1, 150.2 . . . 150.n may be referred to herein individually or collectively as server systems 150, and GPUs 152.1, 152.2 . . . 152.n may be referred to herein individually or collectively as GPUs 152.

Communication network 110 may include any number of private and public computer networks. Communication network 110 may include network(s) having any of a variety of network types, including local area networks (LANs), wide area networks (WANs), wireless networks, virtual private networks, wired networks, the Internet, personal area networks (PANs), object buses, computer buses, and/or a combination of any suitable communication mediums via which devices may communicate in a secure or insecure fashion.

Data may be transmitted via network 110 using any suitable protocol. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (short messaging service (SMS), internet message access protocol (IMAP), etc.), or other suitable protocols.

Client system 102 may comprise a electronic computing device, such as a personal computer (PC), a laptop, a smartphone, a tablet, a mobile phone, a wearable electronic device, server, server appliance, or any other electronic device or computing system capable of communication with communication network 110. Client system 102 may store one or more client applications in non-transitory memory, including internal memory (not shown) and/or associated storage devices for use by users or other systems. A client application may be executable by a computer processor of client system 102. In some example embodiments, a client application includes one or more applications such as, but not limited to, data storage applications, search applications, data analytics applications, visualization applications, communication applications, productivity applications, game applications, word processing applications, or any other applications. A client application may include a web browser and/or code executable thereby in some cases.

In some embodiments, client system 102 may include an application for receiving data elements (objects, files, sets thereof, etc.) and/or associated inference values and inference metadata generated by the application of a trained AI model to the data element. For instance, clients 102 may be in communication with model server 130 on server system 150.n to access or receive AI inference data for use in a business or personal application. In some embodiments, clients 102 may include computing systems configured for further processing and analysis of inference data, such as inference aggregation, search, analytics, and visualization.

Client systems 102, storage systems 120, and/or server systems 150 may send/receive requests and/or send/receive responses, such as but not limited to HTTP(S) requests/responses, to/from one another. Client system 102 may present information to users, such as visual, audio, tactile, and/or other information via output devices, such as displays, audio reproduction devices, vibration mechanism, etc., based on information generated by a client system 102 and/or received from server system 150.n.

Storage applications 126 may provide an object storage service, manage data storage using data stores 140 (e.g., store, retrieve, and/or otherwise manipulate data in data stores 140 and associated metadata stores, etc.), process requests received from various entities (e.g., client systems 102, server systems 150, local application, etc.), provide for concurrency, provide for data redundancy and replicate data, perform garbage collection, and perform other acts, as discussed further herein. Storage application 126 may include various interfaces, such as software and/or hardware interfaces (e.g., application programming interface(s) (API(s)) that may be accessed (e.g., locally, remotely, etc.)

by components of the system 100, such as various client applications, data ingester 122, data preparer 124, model trainer 128, model server 130, etc.

In some embodiments, storage application 126 may be a distributed application that is implemented in two or more computing systems (e.g., distributed storage systems 120.2-120.*n*). For example, storage application 126 may be configured to manage a plurality of storage systems 120 as a primary storage pool 160 for managing the AI data pipeline for system 100. Storage application 126 may present one or more physical and/or application protocol interfaces of storage systems 120 for interfacing with storage system 120.1 and server systems 150. In some embodiments, data store 140 may comprise a plurality of storage devices, servers, software applications, and other components, such as but not limited to any suitable enterprise data grade storage hardware and software. In some embodiments, storage application 126 may be a local application receiving local and/or remote storage requests from other subsystems (e.g., data ingester 122, data preparer 124, model trainer 128, model server 130**, etc.).

Distributed storage system 120 may be coupled to and/or include an data store 140. Data store 140 may comprise one or more data stores for storing data objects and/or related metadata. Data store 140 may be implemented across a plurality of physical storage devices. In some example embodiments, the plurality of physical storage devices may be located at disparate locations. Data elements stored in data store 140 may be referenced by metadata entries stored in one or more associated metadata stores. In some example embodiments, multiple copies of a given object or portions thereof (e.g., erasure-encoded copies) can be stored at different physical storage devices to protect against data loss through system failure or to have the object quickly accessible from different geographic locations. In some embodiments, metadata stores may comprise databases that stores an ordered set of metadata entries referencing data elements and operations thereon, such as but not limited to, put, get, delete, list, etc.

In some embodiments, metadata stores may comprise a horizontally partitioned database having two or more shards, although other suitable database configurations are also possible and contemplated. As horizontal partitioning is a database design principle whereby rows of a database table are held separately, rather than being split into columns (which is what normalization and vertical partitioning do, to differing extents), each partition can form part of a shard, which may in turn be located on a separate database server or physical location. Depending on the configuration, in some implementations, database shards may be implemented on different physical storage devices, as virtual partitions on the same physical storage device, or as any combination thereof.

In some embodiments, storage systems 120 may include one or more storage systems that are not configured as a part of primary storage pool 160. For example, storage system 120.1 may include data ingester 122 with access to one or more data stores 140.1 containing or configured to receive ingested data elements. In some embodiments, data ingester 122 may receive and/or identify data from data store 140.1 that provides raw data for processing through system 100. Data ingester 122 may provide the raw data to data preparer 124 for selection and processing as training data. In some embodiments, data ingester 122 may store raw data to primary storage pool 160 and data preparer 124 may access the raw data from primary storage pool 160. In some embodiments (not shown), data ingester 122 may be integrated into storage application 126 and storage 140.1 may be part of primary storage pool 160.

In some embodiments, server systems 150 may host data preparer 124, such as a data preparation application used by system 100 to prepare training data sets from aggregated raw data. For example, data ingester 122 may aggregate raw data elements in data store 140.1 and/or primary storage pool 160 and data preparer 124 may be configured to identify data types in the raw data, preprocess them to assure compatibility with model trainer 128, and populate training data sets in primary storage pool 160.

In some embodiments, server systems 150 may host model trainer 128, such as a model training application used by system 100 to train model instances based on one or more AI or deep learning frameworks or other computational models. For example, model trainer 128 may operate on training data sets stored in primary storage pool 160 for iterative model training to generate one or more trained model instances. In some embodiments, server system 150.2 may comprise a GPU cluster including a plurality of GPUs 152.1 . . . 152.*n* configured for parallel processing tasks specific to the computational models being implemented. For example, an AI or deep learning framework that targets large volumes of video, image, audio, text, numeric, or other data types may utilize GPUs customized for video or image processing, audio processing, semantic analysis, or other computational processing schemes. In some embodiments, model trainer 128 may be selectively executed using numbers and types of GPUs configured for a current or anticipated workload of the model training task or tasks. In some embodiments, server system 150.2 may be configured with limited persistent or non-volatile memory storage beyond that used by operations in process and may access memory and storage resources of primary storage pool 160 for accessing and processing training data. Model trainer 128 may store trained model instances in primary storage pool 160.

In some embodiments, server systems 150 may host model server 130, such as a model serving application used by system 100 to serve inferences to clients 102 in the form of inference data, such as inference scores and inference metadata associated with specific data elements and/or aggregations thereof. For example, model server 130 may access trained models stored in primary storage pool 160 to deploy those models for production use in generating real-time insights based on new data elements received by system 100.

It should be understood that the system 100 illustrated in FIG. 1 is representative of an example system and that a variety of different system environments and configurations are contemplated and are within the scope of the present disclosure. For instance, in some further embodiments, various functionality may be moved between the server systems 150 and the distributed storage systems 120, from server systems 150 and the distributed storage system 120 to a client, or vice versa, modules may be combined and/or segmented into further components, data may be consolidated into a single data store or further segmented into additional data stores, and some implementations may include additional or fewer computing devices, services, and/or networks, and may implement various functionality client or server-side. Further, various entities of the system 100 may be integrated into a single computing device or system or additional computing devices or systems, etc.

In some embodiments, some or all components of system 100 may be configured as a cloud computing system to provide AI or deep learning inferences as a service. In some embodiments, the cloud configuration may extend from ingest 10 at data ingester 122 to the inferences 60 generated by model server 130. Clients 102 may be end users of the inferences generated by the system or may themselves be part of the cloud computing configuration to provide one or more end user applications that utilize the inferences. In some embodiments, the various components of system 100 may be configured is modular cloud services that may be selectively combined to support different AI data pipelines and inference deployments for different organization and/or applications. In some embodiments, primary storage pool 160 may be configured as a cloud storage system accessed by the other components via communication network 110 and cloud storage APIs. In some embodiments, one or more functions of data ingester 122, data preparer 124, model trainer 128, and/or model server 130 may be integrated in the cloud storage system of primary storage pool 160.

Figure 2:
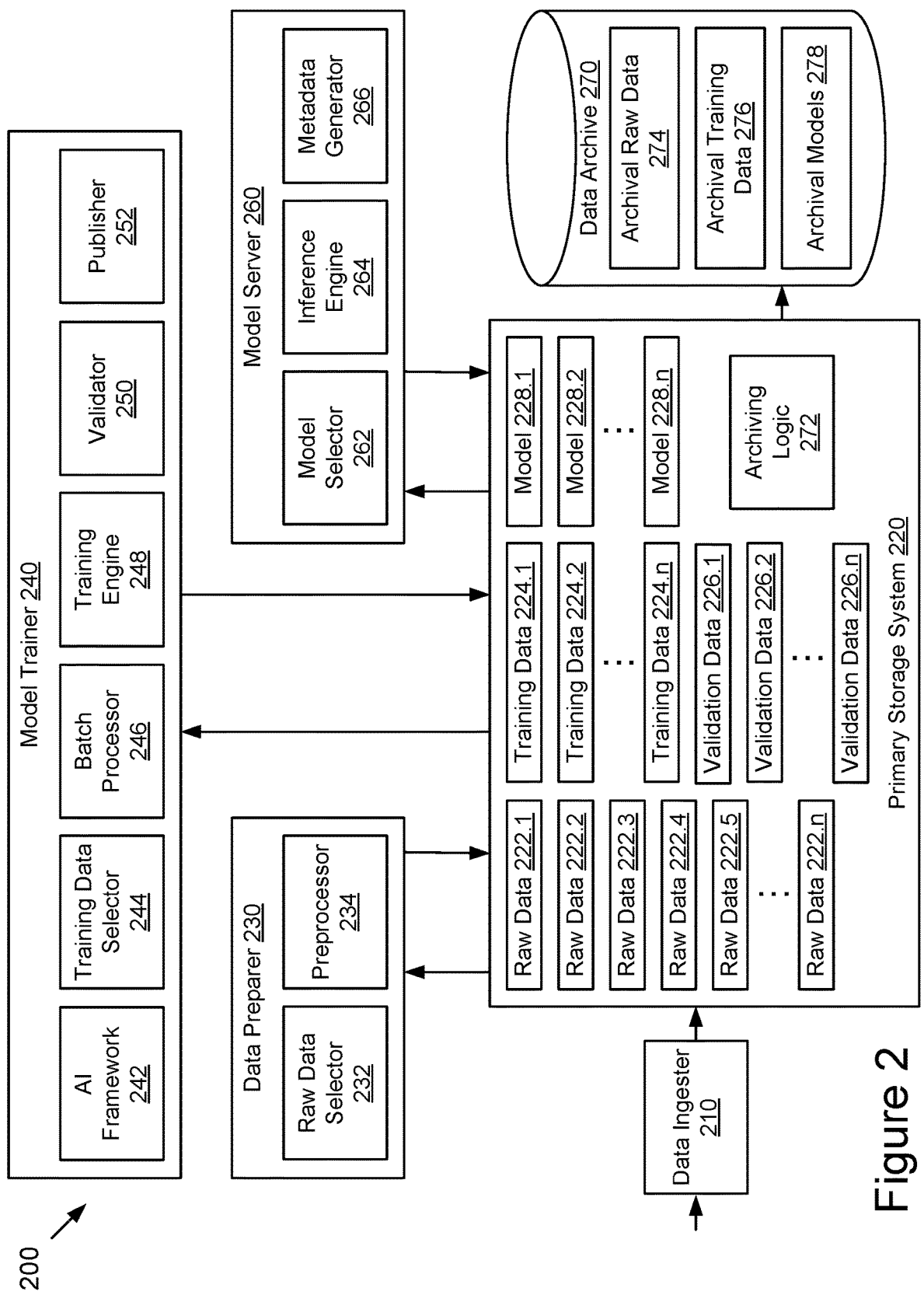
FIG. 2 schematically illustrates an example distributed computing architecture using a primary storage system as a data pipeline.

FIG. 2 schematically shows selected components of a system 200 configured in a distributed computing architecture using a primary storage system as a data pipeline. In some embodiments, system 200 may be implemented in distributed computing system similar to system 100 in FIG. 1. Data ingester 210 may be configured similarly to data ingester 122, primary storage system 220 may be configured similarly to primary storage pool 160, data preparer 230 may be configured similarly to data preparer 124, model trainer 240 may be configured similarly to model trainer 128, and model sever 260 may be configured similarly to model server 130.

Data ingester 210 may include one or more software and/or hardware components for ingesting large volumes of data into primary storage system 220. For example, data ingester 210 may include a data streamer for receiving data gathered by other systems for processing through system 200. In some embodiments, data ingester 210 may be a configurable data import utility that may be directed to one or more other data storage systems, such as an enterprise data warehouse, for selectively ingesting data from such systems. Data received or accessed by data ingester 210 may be referred to as raw data and may include a variety of data elements and data element types in the data formats in which those data elements were previously generated or stored. Data ingester 210 may receive and store individual data elements and/or batches of data elements, which may be aggregated in primary storage system 220 as raw data 222.1-222.n, collectively aggregate raw data 222.

In an alternate embodiment (not shown), data ingester 210 may store raw data 222 into a high-capacity data ingest landing zone. For example, primary storage system 220 may include, support, or interface with a high capacity, lower-cost storage system for storing aggregate raw data. Data preparer 230 may select raw data elements from the data ingest landing zone for the preparation of training data 224. In some embodiments, the high-capacity storage system for raw data may also be used for archival data as described below with regard to data archive 270. In some embodiments, data ingester 210 and/or the data ingest landing zone may be configured in a cloud storage application that is separate from primary storage system 220.

Primary storage system 220 may include one or more software and hardware components for storing data throughout the AI processing and deployment data pipeline. For example, primary storage system 220 may include a distributed storage system configured to receive aggregate raw data 222 from data ingester 210, training data sets 224.1-224.n from data preparer 230, validation data sets 226.1-226.n based on previously validated training data, and trained model instances 228.1-228.n from model trainer 240. In some embodiments, primary storage system 220 may include a shared, high-performance, rack-scale all-flash memory, such as rack-based NVMe flash storage nodes comprised of a plurality of flash-based solid state drives (SSDs).

In some embodiments, primary storage system 220 may be configured as an object storage system that stores data elements as data objects with associated metadata and metadata store. For example, raw data 222 may be stored in data objects reflecting an original data format for the ingested data, training data 224 may be stored in data objects with standardized data types and metadata parameters compatible with model trainer 240, validation data 226 may be stored in data object similar to training data 224 but selectively grouped (logically) and associated with known model inference values that may be used to validate newly generated model instances, and trained model instances 228 may be stored in data objects indicating the AI framework, functions, and parameters to be used for deploying the models for processing new data elements.

Data preparer 230 may include one or more software and/or hardware components for generating training data from aggregate raw data 222. For example, data preparer 230 may selectively process some or all of aggregate raw data 222 according predefined selection and formatting parameters to generate one or more training data sets 224. In some embodiments, data preparer 230 may include a raw data selector 232 configured for selecting raw data elements to be evaluated and/or used for training data. For example, data preparer 230 may include an interface protocol and/or set of functions and parameters for determining sets of raw data to be selected based on training data criteria compatible with the AI framework and processing capabilities of model trainer 240. In some embodiments, data preparer 230 may include a preprocessor 234 configured for processing or modifying raw data elements to be compatible with the AI framework and processing capabilities of model trainer 240. For example, preprocessor 234 may include functions, parameters, and/or data structures for reformatting selected raw data elements into predetermined data types and/or data formats (including data element and associated metadata formats), such as data conversion utilities, transfer functions, data templates or masks, etc. Once the data preparation phase has been completed by data preparer 230, training data may be stored in primary storage system 220.

Model trainer 240 may include one or more software and/or hardware components for generating and validating trained model instances for a computational model, such as an AI framework. For example, model trainer 240 may be operating on one or more training data sets 224 in primary storage system 220 to generate trained model instances 228. In some embodiments, model trainer 240 may be hosted by a GPU compute cluster configured to access the training data from primary storage system 220 without using any local flash storage or similar permanent storage resource. For example, model trainer 240 may use remote direct memory access (RDMA) or another remote memory access protocol to operate directly on training data sets 224 or batches thereof in primary storage system 220 without first transferring training data sets 224 into local permanent storage. Model trainer 240 may store trained model instances 228 back to primary storage system 220.

In some embodiments, model trainer 240 may include an AI framework 242 configured to define an AI or deep learning computational model and related parameters for processing training data sets 224 to generate trained model instances 228. For example, AI framework 242 may include functions, parameters, and/or data structures defining a specific algorithm and related approach to machine learning. In some embodiments, AI framework 242 may include one or more interfaces to processing components related to the AI framework, such as training data selector 244, batch processor 246, training engine 248, validator 250, and/or publisher 252. For example, cloud or application-based AI frameworks, such as Tensorflow, PyTorch, PaddlePaddle, Caffe, Azure, etc., may provide an integrated model training application and/or related API for processing training data sets and returning model instances. In some embodiments AI framework 242 may define specific machine learning algorithms and related computational models available to model trainer 240. In some embodiments, AI framework 242 may be specifically associated with the processing capabilities of a GPU cluster hosting model trainer 240. In some embodiments, AI framework 242 may include supervised machine learning based on known training data sets, such as classification, regression, and supervised neural network algorithms. In some embodiments, AI framework 242 may include unsupervised machine learning based on unknown training data sets and validated with a known validation data set, such as clustering, anomaly detection, association rules, and unsupervised neural network algorithms.

In some embodiments, model trainer 240 may include a training data selector 244 configured to select training data sets from among training data sets 224 for generating a particular model instance. For example, training data selector 244 may include an interface protocol and/or set of functions and parameters for defining a relevant training data set for a particular iteration of AI framework 242 through training engine 248. In some embodiments, training data selector 244 may operate in conjunction with data preparer 230, primary storage system 220, and/or data ingester 210 to identify available training data and/or raw data that may be processed into training data. For example, training data selector 244 may be configured to support an API or graphical user interface to enable a user to select or configure automated selection of training data sets for use by model trainer 240.

In some embodiments, model trainer 240 may include a batch processor 246 configured to access batches of training data in primary storage 220. For example, batch processor 246 may include an interface protocol and/or set of functions and parameters for remotely accessing training data sets 244 or portions thereof for processing by training engine 248. In some embodiments, batch processor 246 may access training data 244 for operations by training engine 248 using only transient local memory directly associated with the processors (GPU or CPU) hosting model trainer 240. For example, batch processor 246 may move selected training data in processing batches specifically matched to memory buffers, registers, or similar hardware configurations associated with the host processors.

In some embodiments, model trainer 240 may include a training engine 248 configured to process selected training data in accordance with AI framework 242. For example, training engine 248 may include functions, parameters, and/or data structures for iteratively executing the algorithm(s) of AI framework 242, storing interim model processing values, monitoring for model selection criteria (statistical thresholds, convergence, parameter stability, etc.), and returning a generated model instance with associated computational model type and model parameter values.

In some embodiments, model trainer 240 may include a validator 250 configured to process at least one validation data set 226 through newly generated model instances to validate the model is ready for production use. For example, validator 250 may include functions, parameters, and/or data structures for applying one or more validation data elements from validation data 226 to the newly generated model and comparing a resulting reliability value, such as an inference score, against a model validity threshold value. Measuring the reliability value based on a known validation data set and comparing it to the model validity threshold may enable validator 250 to determine whether the threshold is met and the model instance appears valid or the threshold is not met and retraining should be initiated using different parameters for AI framework 242 and/or a different training data set. In some embodiments, validation data 226 for use by validator 250 may be curated by a user and/or generated from predetermined data sets with validated inference values and stored to primary storage system 220 from any other source, including model trainer 240 or another computational modeling application.

In some embodiments, model trainer 240 may include a publisher 252 configured to publish trained model instances for production use by model server 260. For example, publisher 252 may include an interface protocol and/or set of functions and parameters for storing model instances 228 to primary storage system 220. In some embodiments, publisher 252 may also notify model server 260 of the availability of newly stored model instances. For example, the notification may include a message identifying the new model instance, one or more parameters for the selection and use of that model instance, and a storage location or storage identifier associated with the model instance in primary storage system 220.

Model server 260 may include one or more software and/or hardware components for deploying trained model instances to generate inferences and inference metadata for use by other applications, including client applications. For example, model server 260 may access model instances 228 in primary storage system 220 and process data elements, such as data objects, files, data structures, and aggregations thereof, using the accessed model instance to generate inferences.

In some embodiments, model server 260 may include a model selector 262 configured to select one or more model instances 228 for processing a selected data element, such as a new data element received by system 200. For example, model selector 262 may include an interface protocol and/or set of functions and parameters for matching data elements, model instances, and client applications supported by inferences from those models. In some embodiments, the data type of the data element may be indexed against one or more inference categories and/or client applications supported by the inference categories to select a model instance that may generate the desired inference categories from the data element. The model serving layer may access the trained models on demand from primary storage system 220 based on the selection of model selector 262 to provide inferences without significant delay.

In some embodiments, model server 260 may include an inference engine 264 configured to process the data element using the model instance to generate one or more inference values. For example, inference engine 264 may include functions, parameters, and/or data structures for using the model instance selected by model selector 262 to process a target data element and generate one or more inference values, including an inference score that may be used to evaluate the quality or validity of inference values generated by inference engine 264. In some embodiments, model server 260 may include a metadata generator 266 configured to operate in conjunction with inference engine 264 to generate inference metadata based on one or more inference values generated by inference engine 264. For example, metadata generator 266 may include interfaces and/or functions and parameters to receive inference values generated by inference engine 264 and structure them as metadata descriptive of the data element. This custom inference metadata may be sent or made available to one or more client systems, such as an inference metadata data store for aggregating inference metadata for a plurality of data elements. In some embodiments, inference engine 264 may be selected from or interface with inference engines for a specific AI framework 242, such as TensorFlow for image analysis, PyTorch for video object detection, or Paddle-Paddle for text analysis using natural language processing. In some embodiments, inference engine 264 may rank inference results and selectively return inference results based on those rankings.

In some embodiments, primary storage system 220 may support or include a data archive 270. For example, primary storage system 220 may include archiving logic 272 configured for evaluating model instances 228 to determine whether they are valid and actively used by model server 260. As the number of model instances and related data grow over the operating time of system 200, it may be desirable to archive model instances and supporting data sets into a high capacity, persistent and potentially lower cost storage solution. For example, data archive 270 may include a separate cloud storage system configured for slow-retrieval archival storage or tiered storage nodes within primary storage system 220. In some embodiments, data archive 270 may receive and store archival raw data 274, archival training data 276, and archival models 278. In some embodiments, archival data in data archive 270 may be organized or mapped based on relatedness to provide snapshots of the raw data set, training data set, and validation data set used for each archival model instance included in the archive. In some embodiments, a data ingest landing zone, primary storage system 220, and data archive 270 may be integrated in a single distributed storage system, such as a tiered storage system, that is configured as a cloud storage system with a plurality of interfaces or APIs for the other components of system 200.

Figure 3:
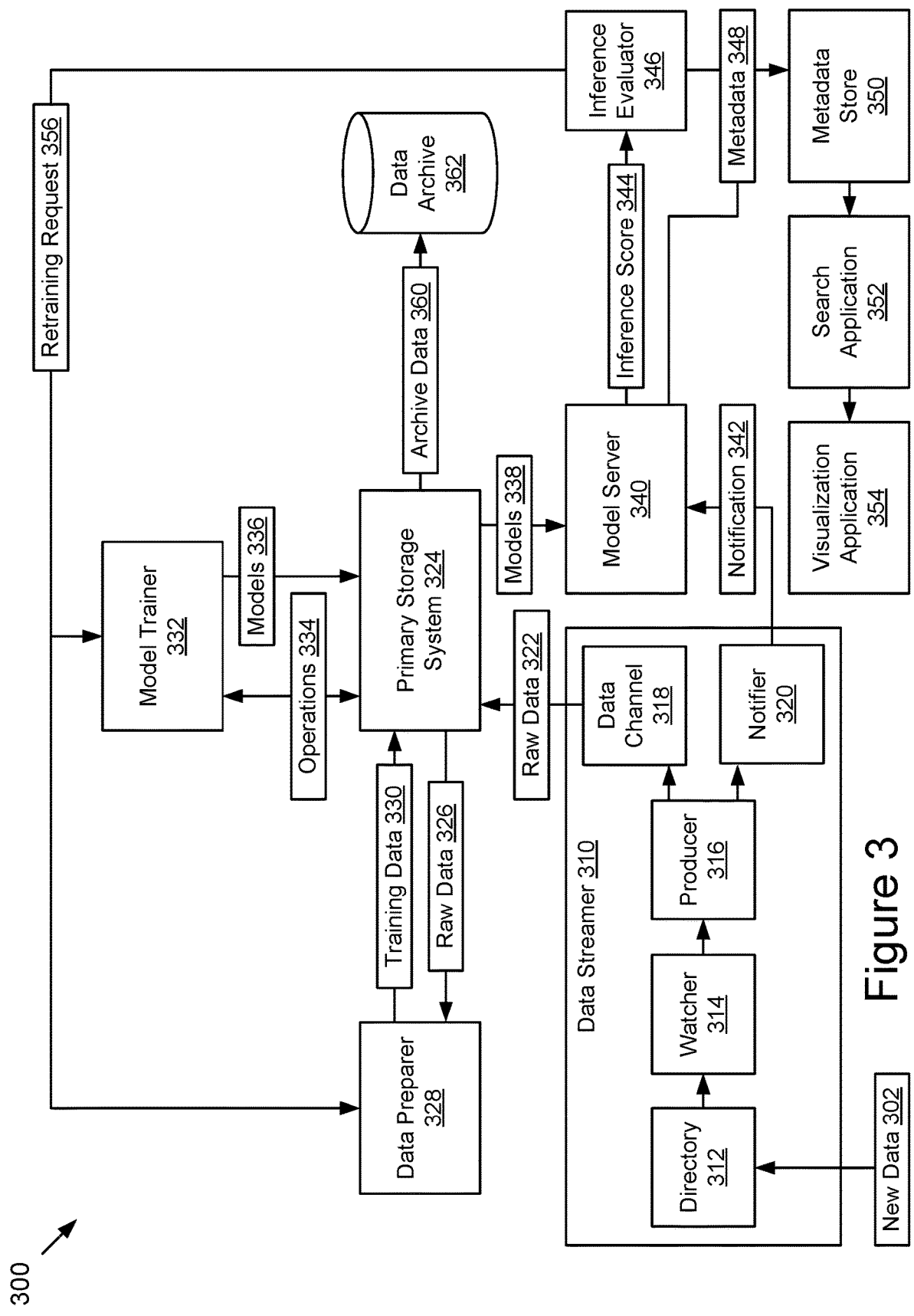
FIG. 3 schematically illustrates an example data flow through an example distributed computing architecture, such as the architecture of FIG. 2.
Figure 4:
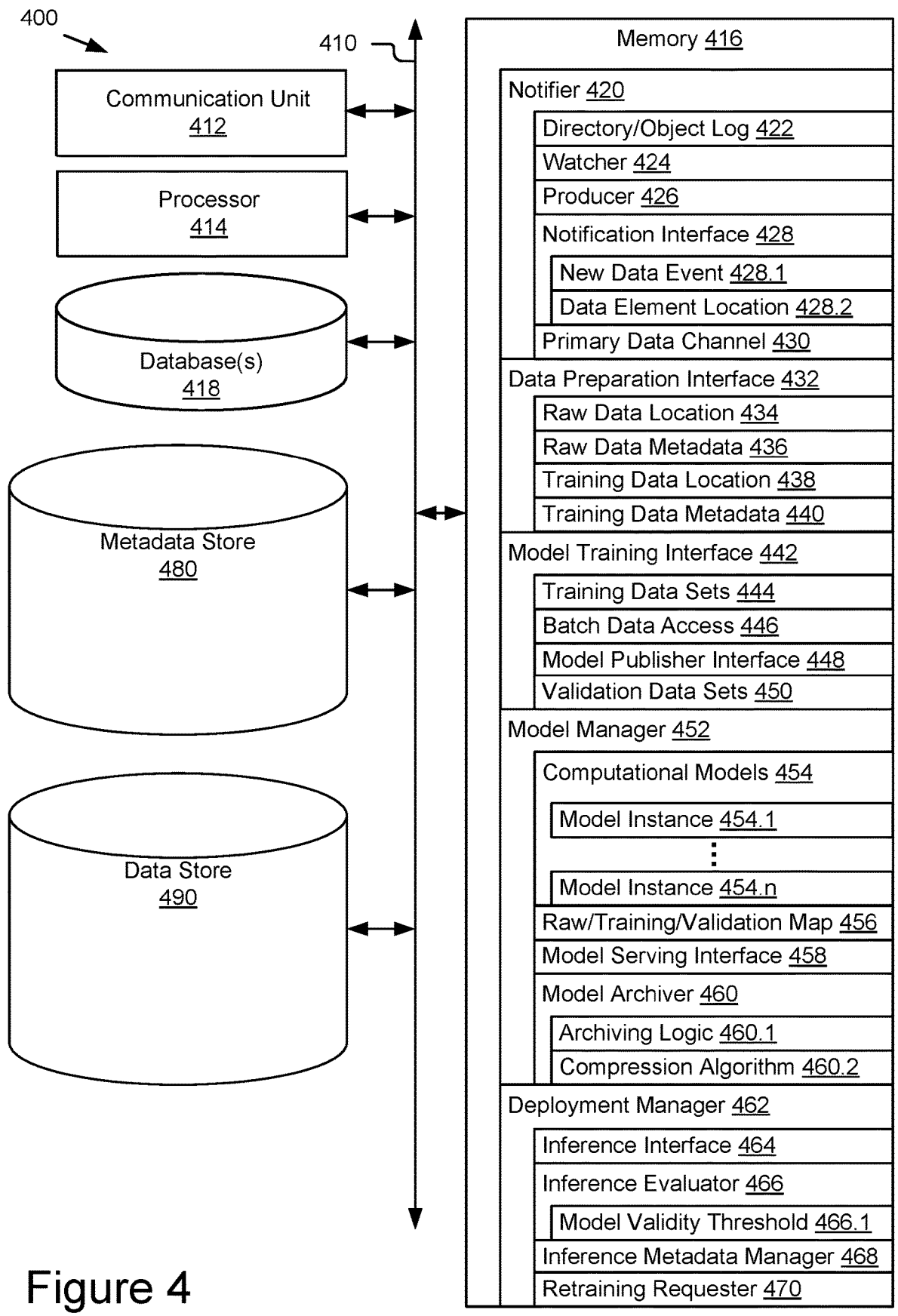
FIG. 4 schematically illustrates some example elements of a primary storage system that may be implemented in the systems of FIGS. 1-3.

FIG. 3 schematically shows an example data flow through an example distributed computing system 300, which may be configured similarly to system 200 of FIG. 2 and/or system 400 of FIG. 4. New data 302 may be received by a data ingester configured as a data streamer 310. For example, data ingester 210 in FIG. 2 may be configured as data streamer 310. In some embodiments, data streamer 310 may include a directory 312 configured to identify data elements received by data streamer 310 or an associated data store, such as a data ingest landing zone or primary storage system 324. For example, directory 312 may include a file directory or metadata transaction log with entries for each data element available through data ingest. Watcher 314 may be a service or function of data streamer 310 that monitors directory 312 to identify new data elements that may be processed as raw data for the AI data pipeline and a data element instance for processing through one or more existing model instances available to model server 340. For example, watcher 314 may identify new data elements, such as images, text data, internet-of-things (IoT) data, audio, or videos, and push them to producer 316.

Producer 316 may be a service or function to identify the data element content, storage location, and related metadata for parallel processing through data channel 318 and notifier 320. For example, the data element content may be passed to data channel 318 with a storage location or storage identifier for use in storing the data element to primary storage as raw data 322. The storage location and the related metadata may simultaneously be passed to notifier 320 for use in notifying model server 340 that the new data element is available for processing through one or more deployed model instances.

In an example embodiment, producer 316 may be configured as a Kafka producer instance and the Kafka producer may publish the file content, locations and metadata to Kafka topics configured as data channel 318 and notifier 320 respectively. The data channel Kafka topic may stream the file contents (raw data 322) to primary storage system 324. The notifier Kafka topic may send an event notification 342, including the location of raw data 322 being stored in primary storage system 324, to model server 340. In some embodiments, producer 316 may receive or assign a data object identifier that may be combined with destination storage system identifiers for primary storage system 324 (including volumes, inodes, or buckets therein) that enable model server 340 and other system components to identify and retrieve raw data 322 from primary storage system 324 when needed.

Raw data 322 stored in primary storage system 324 may be retrieved or operated on by data preparer 328 as raw data 326. For example, raw data 326 may include a batch of aggregate raw data that combines raw data 322 from new data 302 with other raw data elements received before, after, or in parallel with raw data 322. Data preparer 328 may select raw data 326 and preprocess it to generate training data 330. Data preparer 328 may store training data 330 back to primary storage system 324.

Training data 330 stored in primary storage system 324 may be operated on by model training operations 334 from model trainer 332. For example, model trainer 332 may use a batch process for processing training data 330 in primary storage system 324 without moving training data 330 to persistent storage within model trainer 332. Model trainer 332 may return trained models 336 for storage in primary storage system 324.

Model server 340 may select trained models 338 for processing new data 302 based on notification 342. For example, model server 340 may identify a data type from data element metadata in notification 342 and access an appropriate model instance from trained models 338 for processing new data 302. Model server 340 may use the model instance to analyze the new data element and generate labels and custom metadata for the new data element, including an inference score for determining the quality or reliability of the inferences generated. The resulting inference score 344 may be sent to inference evaluator 346. In some embodiments, model server 340 may evaluate a plurality of model instances and/or related inference results and deliver a set of inference results with the top inference score or scores.

Inference evaluator 346 may evaluate inference score 344 against an inference validity threshold to determine whether a valid inference has been generated by the application of a model instance from trained models 338 to new data element 302. For example, if the highest inference score for a new data element or data type is less than the inference validity threshold (e.g., 80%), system 300 may identify the inference (or inferences) as invalid and reconsider the validity of the model instance for that type of data. If the inference score does not meet the inference validity threshold, then a retraining request 356 may be generated by inference evaluator 346 and sent to data preparer 328 and/or model trainer 332 to initiate retraining to generate a new model instance. In some cases, the retraining request may identify new data element 302 (and/or a batch of data elements of a similar data type and/or ingestion period) for preparation and inclusion in the training data set for a next iteration of model trainer 332 to generate a new (retrained) model instance. For example, retraining request 356 may include the raw data storage locations or storage identifiers in primary storage system 324 for use by data preparer 328 in generating the retraining data set. If the inference score does meet the inference validity threshold, then inference metadata 346 may be published to one or more client systems or applications, such as inference metadata store 350.

Metadata store 350 may be configured to aggregate inference metadata from a plurality of new data elements during an operating period of system 300. For example, metadata store 350 may be configured as a key-value store and receive data element identifiers, storage paths or locations, and inference metadata, such as generated data labels, extracted or calculated parameters, and other metadata identified by the model instance(s) used. In some embodiments, metadata store 350 may be hosted in primary storage system 324. In some embodiments, metadata store 350 may support a search application 352, such as Elasticsearch, a visualization application 354, such as Kibana, and/or other data search and analytics applications. Metadata store 350, search application 352, and visualization application 354 are examples of client applications that may make use of aggregate inference data generated by system 300 and are by no means exhaustive.

In some embodiments, primary storage system 324 may also be configured to archive model instances and related data that are no longer in production use by model server 340. For example, primary storage system 324 may include logic for selecting and archiving archive data 360 to data archive 362. Archive data 360 may include archival model instances and related archival training data, validation data, and/or raw data. In some embodiments, data archive 362 may be persistent, high-capacity storage configured as long-term, lower-cost, and generally slower storage, either as a separate storage system or as an archival storage tier within primary storage system 324. In some embodiments, data archive 362 may be cloud storage accessed through a cloud connector or similar API and may be available for backup, future reference, and/or deeper analytics and research.

FIG. 4 schematically shows selected modules of a server system, distributed storage system, and/or combination thereof hosting a storage application configured for an AI data pipeline as described above. System 400 may include a bus 410 interconnecting at least one communication unit 412, at least one processor 414, and at least one memory 416. Bus 410 may include one or more conductors that permit communication among the components of system 400. Communication unit 412 may include any transceiver-like mechanism that enables system 400 to communicate with other devices and/or systems. For example, communication unit 412 may include wired or wireless mechanisms for communicating with file system clients, other access systems, and/or one or more object storage systems or components, such as storage nodes or controller nodes. Processor 414 may include any type of processor or microprocessor that interprets and executes instructions. Memory 416 may include a random access memory (RAM) or another type of dynamic storage device that stores information and instructions for execution by processor 414 and/or a read only memory (ROM) or another type of static storage device that stores static information and instructions for use by processor 414 and/or any suitable storage element such as a hard disc or a solid state storage element.

System 400 may include or have access to one or more databases and/or specialized data stores, such metadata store 480 and data store 490. Databases may include one or more data structures for storing, retrieving, indexing, searching, filtering, etc. of structured and/or unstructured data elements. In some embodiments, metadata store 480 may be structured as reference data entries and/or data fields indexed by metadata key value entries related to data objects stores in data store 490. Data store 490 may include data objects comprised of object data (such as host data), some amount of metadata (stored as metadata tags), and a globally unique identifier (GUID). Metadata store 480, data store 490, and/or other databases or data structures may be maintained and managed in separate computing systems, such as server nodes, storage nodes, controller nodes, or access nodes, with separate communication, processor, memory, and other computing resources and accessed by system 400 through data access protocols. Metadata store 480 and data store 490 may be shared across multiple storage systems.

Storage system 400 may include a plurality of modules or subsystems that are stored and/or instantiated in memory 416 for execution by processor 414. For example, memory 416 may include a notifier 420 configured to monitor for data ingest and initiate parallel storage and deployment of a new data element. Memory 416 may include a data preparation interface 432 configured to interface with a data preparer for generating training data from raw data. Memory 416 may include a model training interface 442 configured for training model instances based on training data stored in data store 490. Memory 416 may include a model manager 452 configured for managing models stored in data store 490. Memory 416 may include a deployment manager 462 configured for evaluating and managing inference data generated from deployed models. In some embodiments, notifier 420, data preparation interface 432, model training interface 442, model manager 452, and/or deployment manager 462 may be integrated into a storage application (such as storage application 126 in FIG. 1), a cloud-based data pipeline application, and/or managed as separate libraries or background processes (e.g. daemon) through APIs or other interfaces.

Notifier 420 may include an interface protocol and/or set of functions and parameters for monitoring new data ingested by data store 490 and/or ready for ingest to data store 490. For example, notifier 420 may be configured as a service in a cloud storage application or data streamer in distributed storage system, such as an object storage system. In some embodiments, notifier 420 may include a plurality of hardware and/or software modules configured to use processor 414 and memory 416 to handle or manage defined operations of notifier 420. For example, notifier 420 may include a directory or object log 422, a watcher 424, a producer 426, a notification interface 428, and a primary data channel 430.

Directory or object log 422 may include an interface, function, or logic, as well as related data structures, for managing data elements being added to data store 490 or another storage location functioning as an ingest landing zone. For example, a storage system hosting data store 490 and/or another ingest landing zone may maintain a listing of files, data objects, or other data elements stored. As new data elements are received, they may generate a new entry in directory or object log 422. For example, new data objects received by data store 490 may generate a write or object creation operation entry in a metadata log stored in metadata store 480.

Watcher 424 may include an interface, function, or logic, as well as related data structures, for monitoring directory or object log 422 to identify new data elements as they are received or created. For example, watcher 424 may be configured to detect new entries in directory or object log 422 and evaluate whether or not the new entry represents a new data element (as opposed to a read request, modification, deletion, data management/housecleaning tasks, etc.). In some embodiments, watcher 424 may be configured to watch for specific data types, metadata, or other indicators that designate raw data eligible for processing through the AI data pipeline.

Producer 426 may include an interface, function, or logic, as well as related data structures, for identifying the data element content, storage location, and related metadata for parallel processing. For example, producer 426 may receive a message from watcher 424 indicating that a new data element is being ingested or available for ingest. Producer 426 may identify the data element and determine a target storage location in data store 490. In some embodiments, the data element may include metadata descriptive of the size, type, format, and/or tags encoded with the raw data element and producer 426 may be able to access and populate metadata parameters descriptive of the raw data element that are useful to downstream system components, such as notification interface 428 and the model server(s) receiving any notifications. Producer 426 may also define a plurality of recipients of the data element information it is configured to publish and include interfaces for reaching those recipients. For example, producer 426 may include interfaces for publishing new data element information to notification interface 428 and primary data channel 430.

Notification interface 428 may include an interface, function, or logic, as well as related data structures, for generating and sending a notification message to one or more model servers configured to deploy computational models and use those models to generate inferences from new data elements. For example, notification interface 428 may generate a notification message based on a new data event 428.1 and including a new data element identifier and data element location 428.2 (addressable storage location) for retrieving the data element content from data store 490. In some embodiments, additional metadata describing the raw data element may also be forwarded from the information received from producer 426. In some embodiments, system 400 may support a plurality of model servers implementing a number of model instances and notification interface 428 may include logic for routing the notification request to one or more specific model servers based on information related to the raw data element.

Primary data channel 430 may include an interface, function, or logic, as well as related data structures, for storing the new data element in data store 490 for subsequent use by other components. For example, primary data channel 430 may include an object storage path for a new data object embodying the raw data identified as new by watcher 424 and producer 426. In some embodiments, primary data channel 430 may operate in conjunction with one or more of directory or object log 422, watcher 424, and/or producer 426 to enable these other functions to correctly identify the addressable storage location of the new data element once it is processed through primary data channel 430. For example, in an object storage system, producer 426 may use or assign an object identifier (e.g. GUID) and destination storage system (storage system identifier and/or bucket or other logical partition identifier) sufficient to address the resulting data object stored by primary data channel 430 in data store 490. As a result of primary data channel 430, the new data element may be stored in its raw data form in data store 490.

Data preparation interface 432 may include an interface protocol and/or set of functions and parameters for enabling a data preparer to access raw data stored by data store 490 and return training data for storage in data store 490. For example, data preparation interface 432 may be configured as a service in a cloud storage application or API in a distributed storage system for communication with and data transfer to and from a data preparation application. In some embodiments, data preparation interface 432 may include a plurality of hardware and/or software modules configured to use processor 414 and memory 416 to handle or manage defined operations of data preparation interface 432. For example, data preparation interface 432 may include a raw data location/object 434, a raw data type/metadata 436, a training data location 438, and training data metadata 440.

Data preparation interface 432 may include a first interface portion for enabling access to aggregate raw data stored in data store 490. Raw data location 434 may include an interface, function, or logic, as well as related data structures, for identifying the addressable storage location of raw data elements. For example, raw data location 434 may include a directory, snapshot, table, or other aggregated location data for identifying the storage location (such as by storage system and object identifiers, file name and partition, or other logical addressing scheme). Raw data metadata 436 may include an interface, function, or logic, as well as related data structures, for identifying additional information about of raw data elements, such as size, type, format, storage or operation timestamps, and other metadata parameters. For example, a data element identifier may be mapped to a table or other aggregated metadata for providing access to additional information about the raw data element. In some embodiments, raw data location 434 and raw data metadata 436 may be included in a combined table, database, or other data structure indexed by unique raw data identifiers. This information may be published or accessible to the data preparation application to enable the data preparation application to discover and select aggregate raw data for use in generating training data sets.

Data preparation interface 432 may include a second interface portion for receiving training data sets from the data preparation application for storage in data store 490. Training data location 438 may include an interface, function, or logic, as well as related data structures, for identifying the addressable storage location of a group of training data elements for use in a training data set. For example, training data location 434 may include a directory, snapshot, table, or other aggregated location data for identifying the storage location of one or more training data elements returned from the data preparation application. Training data metadata 440 may include an interface, function, or logic, as well as related data structures, for identifying additional information about of training data elements, such as size, type, format, storage or operation timestamps, and other metadata parameters. In some embodiments, training data metadata 440 may also include groupings of training data elements into training data sets, which may define both the training data elements that are members of the set and aggregate metadata describing the set. For example, training data element identifiers may be mapped to a table or other aggregated metadata for providing additional information about the training data elements and training data sets. In some embodiments, training data location 438 and training data metadata 440 may be included in a combined table, database, or other data structure indexed by unique training data identifiers. This information may be published or accessible to model training interface 442 for use by the model training application in the selection and processing of training data sets.

Model training interface 442 may include an interface protocol and/or set of functions and parameters for enabling a data trainer to access training data stored by data store 490 and return trained models for storage in data store 490. For example, model training interface 442 may be configured as a service in a cloud storage application or API in a distributed storage system for communication with and data transfer to and from a model training application. In some embodiments, model training interface 442 may include a plurality of hardware and/or software modules configured to use processor 414 and memory 416 to handle or manage defined operations of model training interface 442. For example, model training interface 442 may include training data sets 444, batch data access 446, model publisher interface 448, and validation data sets 450.

Training data sets 444 may include an interface, function, or logic, as well as related data structures, for identifying the addressable storage location of a group of training data elements for use in a training data set. For example, training data sets 444 may include a directory, snapshot, table, or other data structure summarizing one or more training data sets available for use by the model training application. In some embodiments, training data sets 444 may use training data location 438 and training data metadata 440 received or generated by data preparation interface 432 to enable the model training application to discover, select, and access desired training data for use in a training data set.

Batch data access 446 may include an interface, function, or logic, as well as related data structures, for enabling the model training application to directly access batches of training data elements (or aggregations or portions thereof) for processing by the model trainer. For example, batch data access 446 may be configured as remote data access to a defined window of training data compatible with the operations of the model trainer. In some embodiments, processing of a training data set may include sequentially, selectively, and/or iteratively accessing portions of training data in accordance with batch sizes enabled by batch data access 446 and the model trainer until all training data elements in a training data set have been processed.

Model publisher interface 448 may include an interface, function, or logic, as well as related data structures, for receiving trained model instances from the model trainer for storage in data store 490. For example, the model trainer may generate one or more trained model messages, files, data objects, or other data structures defining the parameters of a model instance generated by the model trainer and model publisher interface 448 may receive and store those trained models as data objects or in some other data structure in data store 490.

In some embodiments, the model trainer may also support the use of validation data sets stored in data store 490. Validation data sets 450 may include an interface, function, or logic, as well as related data structures, for enabling the model trainer to access validation data sets stored in data store 490. For example, validation data sets for different types of computational models, data types, and other configurations may be stored in data store 490 and selectively accessed using a directory, snapshot, table, or other data structure summarizing the available validation data sets and one or more parameters for use in selection of validation data sets. In some embodiments, only validated model instances may be published to data store 490 through model publisher interface 448 and failure to validate using validation data sets 450 may trigger retraining using a different training data set, a different computational model, or other configuration changes.

Model manager 452 may include an interface protocol and/or set of functions and parameters for enabling a model server to access training model instances stored in data store 490. For example, model manager 452 may be configured as a service in a cloud storage application or API in a distributed storage system for communication with and data transfer to and from a model server. In some embodiments, model manager 452 may include a plurality of hardware and/or software modules configured to use processor 414 and memory 416 to handle or manage defined operations of model manager 452. For example, model manager 452 may include computational models 454, raw/training/validation data map 456, model serving interface 458, and model archiver 460.

Computational models 454 may include an interface, function, or logic, as well as related data structures, for identifying the addressable storage location of computational models stored in data store 490 for deployment by one or more model server. For example, computational models 454 may include a directory, snapshot, table, or other data structure summarizing model instances 454.1-454.$n$ available for use by the model server. In some embodiments, computational models 454 may use the information received by model publisher interface 448 to enable the model servers to discover, select, and access desired model instances for deployment and generation of inferences.

Raw/training/validation data map 456 may include an interface, function, or logic, as well as related data structures, for mapping the addressable storage locations of the related raw data, training data, and validation data that was used to generate computational models stored in data store 490. For example, raw/training/validation data map 456 may include a directory, snapshot, table, or other data structure summarizing the related data for each model instance 454.1-454.$n$. In some embodiments, raw/training/validation map 456 may be used by model servers, model trainers, and/or administrators of system 300 to track, access, and manage the data underlying model instances for administration, data management, research, and troubleshooting.

Model serving interface 458 may include an interface, function, or logic, as well as related data structures, for receiving and responding to requests from model servers for a selected model instance. For example, model serving interface 458 may receive a model request from a model server and return model parameters defining the model instance to the model server. Model servers may or may not be configured to store the model instance in persistent storage and, in some embodiments, may request the model instance each time it is used (subject to local caching and similar performance enhancements on the server side). In some embodiments, model serving interface 458 may be configured as a model publisher and push new model instances to the model servers for local storage and use.

Model archiver 460 may include an interface, function, or logic, as well as related data structures, for identifying computational models stored in data store 490 that are no longer in active use. For example, model archiver 460 may include archiving logic, such as a set of logical rules, for determining when a model instance is not in active use and may be archived. Responsive to identifying an inactive model instance, the model instance may be moved to a data archive to free space in data store 490. In some embodiments, when a model instance is archived, the related raw data, training data, and/or validation data may be archived with it. For example, raw/training/validation map 456 may be used to identify what related data may be archived with the model instance. Note that because related data may be used by more than one model instance, related data may be archived but not deleted from data store 490 until it is determined that it is no longer needed for training active or future model instances. In some embodiments, model archiver 460 may use compression algorithms 460.2 to reduce the amount of storage needed for archival model instances and archival related data in the archive data store. Active model instances may remain stored in data store 490 to support model serving interface 458.

Deployment manager 462 may include an interface protocol and/or set of functions and parameters for managing the inference output of model servers. For example, deployment manager 462 may receive the inferences generated by one or more model servers based on the model instances stored in data store 490 and selectively aggregate the inference metadata or trigger a retraining request. In some embodiments, deployment manager 462 may include a plurality of hardware and/or software modules configured to use processor 414 and memory 416 to handle or manage defined operations of deployment manager 462. For example, deployment manager 462 may include inference interface 464, inference evaluator 466, inference metadata manager 468, and retraining requester 470.

Inference interface 464 may include an interface, function, or logic, as well as related data structures, for receiving inference data from model servers. For example, inference interface 464 may receive inference data, such as inference scores and inference metadata, from one or more model servers each time the model server processes a new data element using one or more computational models. In some embodiments, model servers may generate at least one model inference score quantifying the statistical quality or validity of the other inference data generated. Other inference data may include labels, extracted data, calculated values, custom metadata tags, and other metadata describing the content of the data element analyzed. In some embodiments, model serving interface 458 may be configured as a model publisher and push new model instances to the model servers for local storage and use. Inference interface 464 may receive or access the inference data for further processing by deployment manager 462. In some embodiments, the inference data generated by the model servers may also be provided to other client applications for real-time decision-making and other AI applications.

Inference evaluator 466 may include an interface, function, or logic, as well as related data structures, for evaluating inference scores for a particular use of one or more models to evaluate a data element or group of data elements. For example, each time a model instance is used to process a new data element, at least one inference score may be provided to inference evaluator 466 for comparison against a model validity threshold 466.1. Model validity threshold 466.1 may include a percentage or absolute threshold value that should be met or exceeded to assure reasonable validity of the inferences generated by the model servers. For example, various AI frameworks include at least one quality metric based on probabilistic or statistical reliability of the framework that may be used as an inference score and evaluated by inference evaluator 466. Inference evaluator 466 may further include logic for determining further actions to be taken based on the inference score meeting or not meeting model validity threshold 466.1. For example, if the threshold is met and the inferences are regarded as valid, then the inference metadata may be passed to inference metadata manager 468. If the threshold is not met and the inferences are regarded as invalid, then retraining requester 470 may be initiated.

Inference metadata manager 468 may include an interface, function, or logic, as well as related data structures, for storing and organizing inference metadata for access and use by other applications. For example, responsive to the inferences being evaluated as valid, inference metadata for the particular model instance and data element may be added to metadata store 480 or another metadata store. In some embodiments, aggregate inference metadata for data elements and models processed through system 400 may be organized in metadata store 480 as a key-value store and provide an interface for other applications and users to search, retrieve, visualize, and otherwise analyze aggregate inference results.

Retraining requester 470 may include an interface, function, or logic, as well as related data structures, for initiating a retraining request to one or more other components of an AI computing system, such as a data preparer or data trainer. For example, responsive to the inferences being evaluated as invalid, retraining requester 470 may generate and send a retraining request to the data preparer indicating one or more data elements that have generated invalid results and should be included in a retraining data set for one or more computational models. In some embodiments, the retraining request may include data element identifiers and/or storage locations for use by the data preparer in locating the raw data for those data elements in data store 490.

Memory 416 may include additional logic and other resources (not shown) for processing data requests, such as modules for generating, queueing, and otherwise managing object or file data requests. Processing of AI data pipeline data requests by the storage application of system 400 may include any number of intermediate steps that yield at least one data request to data store 490 for raw data, training data, validation data, model instances, and/or inference metadata.

Figure 5:
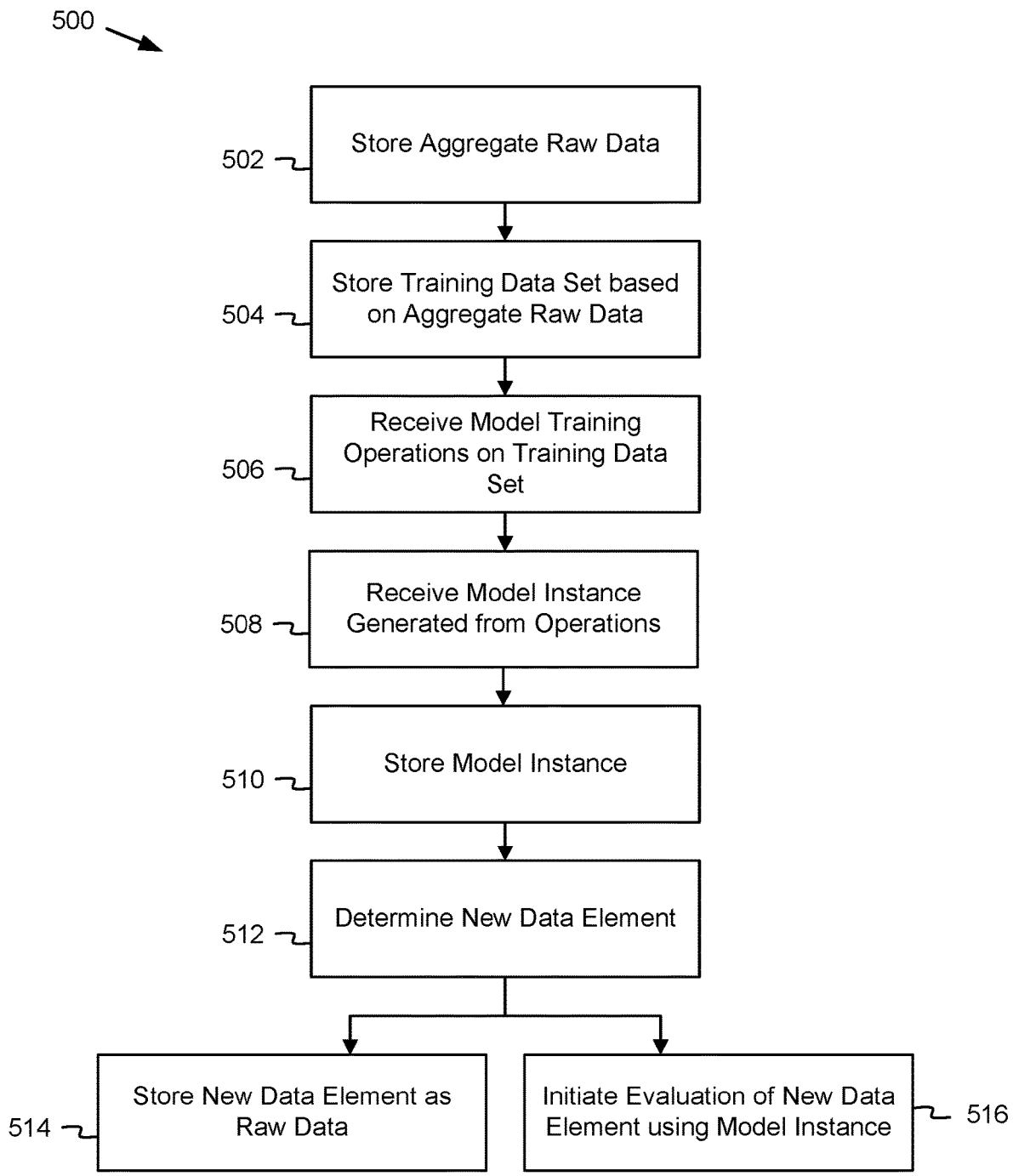
FIG. 5 illustrates an example method of operating a primary storage system configured for parallel storage and notification.

As shown in FIG. 5, the system 400 may be operated according to an example method of operating a primary storage system configured for parallel storage and notification, i.e. according to the method 500 illustrated by the blocks 502-516 of FIG. 5.

At block 502, aggregate raw data may be stored. For example, responsive to data ingest, the primary storage system may store a plurality of raw data elements in a data store configured as a data ingest landing zone.

At block 504, a training data set based on the aggregate raw data may be stored. For example, the primary storage system may receive training data sets processed by a data preparer and store the training data elements in a data store.

At block 506, model training operations may be received for execution on the training data set. For example, the primary storage system may receive model training operations from a model trainer for processing the model training data stored in the primary storage system.

At block 508, a model instance generated from the operations at block 506 may be received. For example, the primary storage system may receive a model instance published by the model trainer based on the training data set targeted at block 506.

At block 510, the model instance received at block 508 may be stored. For example, the primary storage system may store the model instance in a data store.

At block 512, a new data element may be determined. For example, the primary storage system may determine that a new data element has been ingested for processing.

At block 514, the new data element determined at block 512 may be stored as a raw data element. For example, the primary storage system may direct the new data element through a primary storage channel to be stored in the data store as a new raw data object.

At block 516, evaluation of the new data element using a model instance may be initiated. For example, in parallel with storing the new data element to the primary storage system, the primary storage system may send a notification to a model server. The notification may indicate the new data element and an addressable storage location in the primary storage system to enable the model server to evaluate the new data element from the primary storage system using a model instance, also from the primary storage system.

Figure 6:
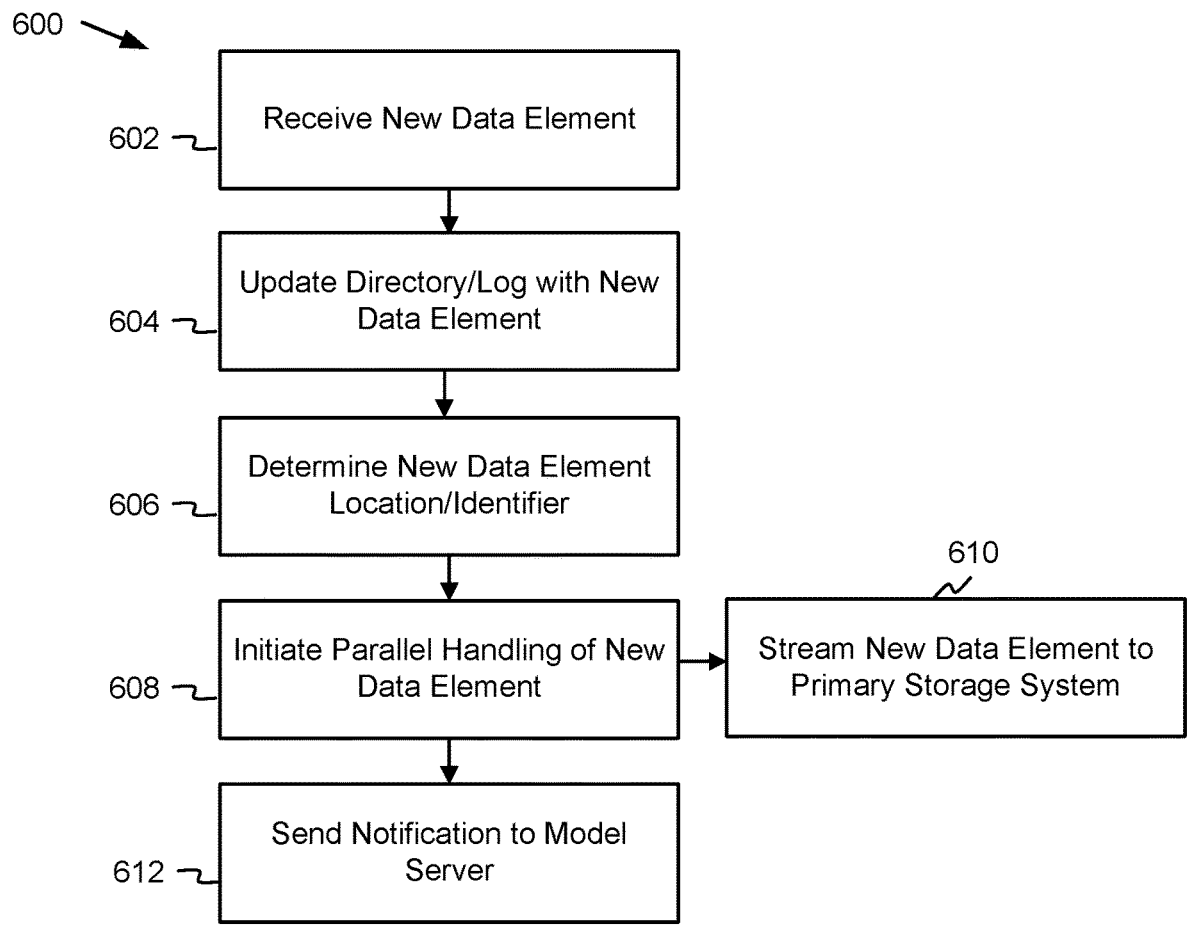
FIG. 6 illustrates an example method of operating a notifier for parallel storage and notification.

As shown in FIG. 6, the system 400 may be operated according to an example method of operating a notifier for parallel storage and notification, i.e. according to the method 600 illustrated by the blocks 602-612 of FIG. 6.

At block 602, a new data element may be received. For example, a data ingester may receive a new data element for processing through an AI computing system.

At block 604, a directory or log may be updated with a reference to the new data element. For example, the primary storage system may generate a log or directory entry for the new data element, such as a new file or new object creation operation.

At block 606, a new data element storage location and/or storage identifier may be determined for the new data element. For example, the notifier may determine or generate a file or object identifier (e.g., GUID) and destination data store (storage system identifier and/or logical volume or bucket identifier) that will provide an addressable storage location for the new data element.

At block 608, parallel handling of the new data element may be initiated. For example, the notifier may initiate blocks 610 and 612 by publishing the new data element storage location to both a primary storage channel (block 610) and a notification interface (block 612).

At block 610, the new data element may be streamed to the primary storage system. For example, the primary storage channel may store the raw data content of the new data element into a data object stored in the primary storage system.

At block 612, a notification of the new data element may be sent to the model server. For example, the notification interface may generate and send a new data element notification to the model server that includes the addressable storage location and other metadata for the new data element that the model server may use to select the model instance for processing the new data element.

Figure 7:
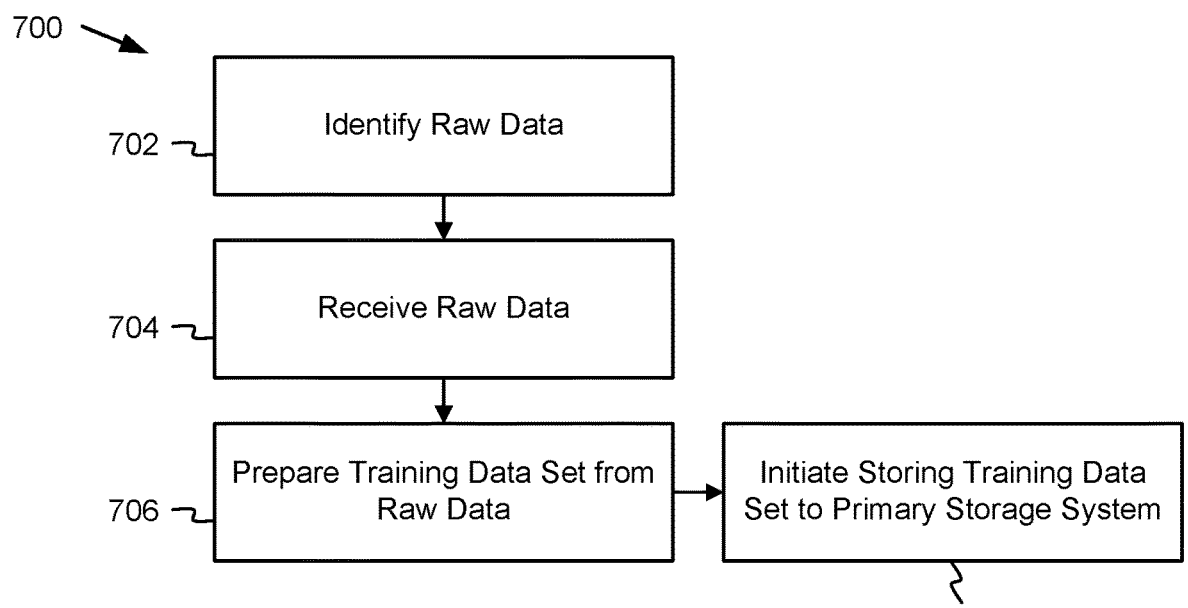
FIG. 7 illustrates an example method of operating a data preparer.

As shown in FIG. 7, the system 200 may be operated according to an example method of operating a data preparer, i.e. according to the method 700 illustrated by the blocks 702-708 of FIG. 7.

At block 702, raw data for preparation of training data may be identified. For example, the data preparer may select a set of raw data elements stored in the primary storage system for use in generating a training data set.

At block 704, the identified raw data may be received. For example, the data preparer may access the raw data elements stored in the primary storage system for aggregation and preprocessing into training data elements.

At block 706, a training data set may be prepared from the raw data elements received at block 704. For example, the data preparer may include functions for preprocessing each of the raw data elements into training data elements formatted in accordance with the acceptable data parameters of the model trainer.

At block 708, storing the training data set to the primary storage system may be initiated. For example, the data preparer may publish or send the training data set and/or the series of training data elements comprising the training data set to the primary storage system for the primary storage system to store, such as in accordance with block 504 in FIG. 5.

Figure 8:
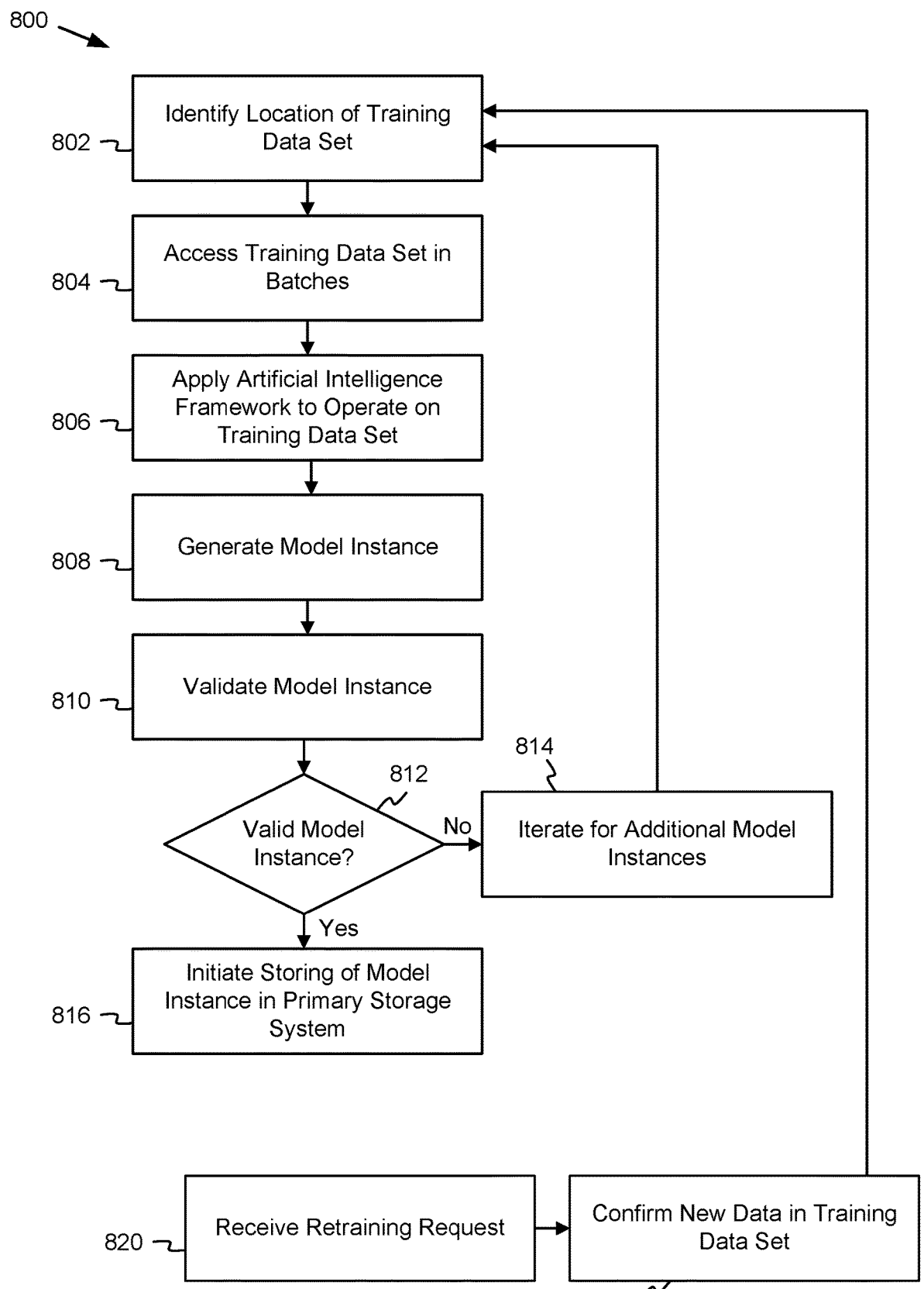
FIG. 8 illustrates an example method of operating a model trainer.

As shown in FIG. 8, the system 200 may be operated according to an example method of operating a model trainer, i.e. according to the method 800 illustrated by the blocks 802-822 of FIG. 8.

At block 802, the location of a training data set may be identified. For example, the model trainer may select a training data set stored in the primary storage system for use in generating a model instance for a selected computational model.

At block 804, the training data set may be accessed in batches. For example, the model trainer may use remote memory access to operate on batches of training data from the training data set in the primary storage system.

At block 806, an artificial intelligence framework may be applied to operate on the training data set. For example, the model trainer may process the batches of training data in accordance with an AI framework for deep learning, using iterative processing to generate parameters for the selected computational model in the AI framework.

At block 808, a model instance may be generated. For example, the model trainer may iterate through the process determined by the AI framework until the best results based on the AI framework and the training data set have been generated.

At block 810, the model instance may be validated using a validation data set. For example, the model trainer may apply the newly generated model instance to a validation data set with known inferences retrieved from the primary storage system.

At block 812, whether a valid model instance has been generated may be evaluated. For example, known inferences associated with the validation data set may be compared against the inferences generated by the newly generated model and compared against a model validity threshold. If the model instance is not valid, the new model inference scores did not meet the model validity threshold, and method 800 may proceed to block 814. If the model instance is valid, the new model inference scores did meet the model validity threshold, and method 800 may proceed to block 816.

At block 814, a next iteration may be initiated to generate additional model instances. For example, method 800 may return to block 802 and the model trainer may identify a new training data set for the selected computational model.

At block 816, storing of the newly generated model instance in the primary storage system may be initiated. For example, the model trainer may publish the model instance and its associated AI framework and parameters to the primary storage system for storage as a new model instance for the computational model.

At block 820, a retraining request may be received from another system component. For example, a model server or deployment manager may determine that inferences generated by a model instance are no longer generating an acceptable inference score (e.g., application to new data elements is generating inference scores below the model validity threshold) and send a retraining request to the model trainer and/or data preparer. The model trainer may directly or indirectly (e.g., from the data preparer or a system administrator) receive the retraining request.

At block 822, new data elements to be included in the next training data set may be confirmed. For example, the retraining request may identify new data elements and their storage locations in the primary storage system for use in the retraining data set and the model trainer may include the new data elements in the identification of the training data set at block 802.

Figure 9:
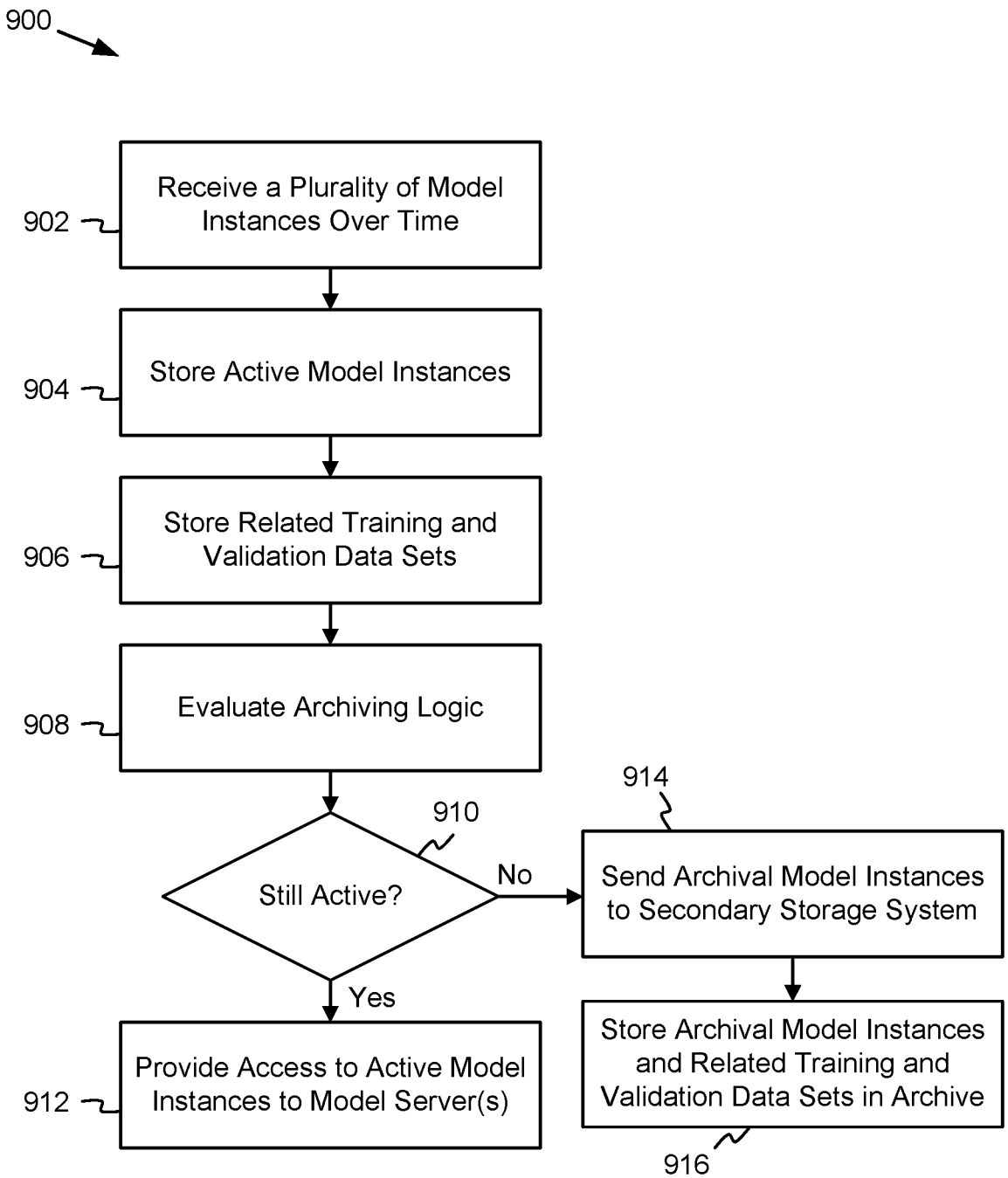
FIG. 9 illustrates an example method of operating a model archiver.

As shown in FIG. 9, the system 400 may be operated according to an example method of operating a model archiver, i.e. according to the method 900 illustrated by the blocks 902-916 of FIG. 9.

At block 902, a plurality of model instances for computational models may be received over time. For example, the primary storage system may receive model instances for one or more computational models over an operating period of the AI computing system.

At block 904, active model instances may be stored in the primary storage system. For example, the primary storage system may be configured with fast-response storage, such as NVMe flash storage nodes, for storing active model instances that are deployed to model servers for real-time inferences.

At block 906, related training data sets, validation data sets, and/or raw data may be stored. For example, the primary storage system may also store the raw data sets, training data sets, and validation data sets used by the AI computing system to generate the model instances and may maintain a cross-reference or data map of the related data for each model instance.

At block 908, archiving logic may be evaluated for model instances. For example, the model archiver may include archiving rules and a schedule for periodically checking the activity and historical use of each active model instance to determine whether they are no longer active. At block 910, whether or not each model instance is still active may be evaluated. For example, model instances that have continued be in active use in a certain time window may not be subject to archiving. If yes, the model instance is still active and method 900 may proceed to block 912. If no, the model instance is no longer active and method 900 may proceed to block 914.

At block 912, access to active model instances may continue to be provided to the model server(s). For example, active model instances remain stored in the fast storage of the primary storage system and may be accessed by the model servers as needed.

At block 914, the archival model instances are sent to a secondary storage system. For example, the primary storage system may send the archival model instances to a separate data archive storage system or a data archive storage tier within the primary storage system.

At block 916, archival model instances and related training and validation data sets may be stored in the data archive. For example, the archival model instances and the raw data, training data, and/or validation data that was used to generate those model instances may be stored in the data archive.

Figure 10:
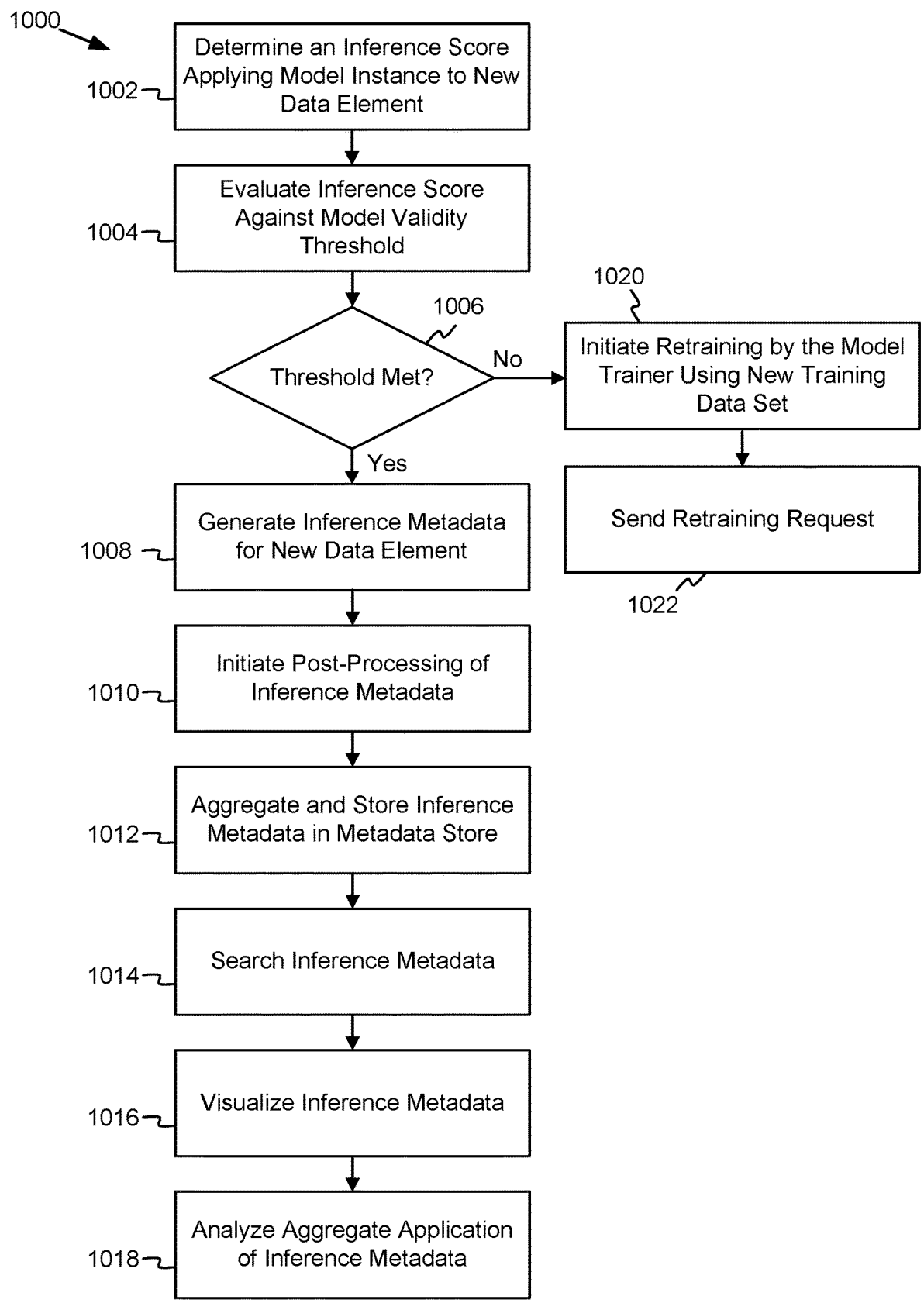
FIG. 10 illustrates an example method of using an inference score from a model server.

As shown in FIG. 10, the system 400 may be operated according to an example method of using an inference score from a model server, i.e. according to the method 1000 illustrated by the blocks 1002-1022 of FIG. 10.

At block 1002, an inference score may be determined for an application of a model instance to a new data element. For example, upon notification of a new data element, the model server may select an appropriate model instance for evaluated in the new data element and evaluation of the new data element may generate inference data, including an inference score.

At block 1004, the inference score may be evaluated against a model validity threshold. For example, a deployment manager may receive the inference score and compare the inference score to a model validity threshold. At block 1006, whether the model validity threshold is met may be determined. If yes, the inferences are regarded as valid and method 1000 may proceed to block 1008. If no, the inferences are regarded as invalid, the applicability of the model to the new data element and/or data elements of that type may not be valid, and method 1000 may proceed to block 1020.

At block 1008, inference metadata for the new data element may be generated. For example, the model server may generate inference metadata from the inferences output by the model instance itself or may be the result of additional processing of inferences into labels, extracts, computations, custom metadata tags, and other inference metadata.

At block 1010, post-processing of inference metadata may be initiated. For example, the model server may send the inference data to one or more client systems for additional processing and use.

At block 1012, inference metadata may be aggregated and stored in a metadata store. For example, the primary storage system may include a metadata store for receiving inference metadata keyed to the data elements and model instances used to generate those inferences.

At block 1014, inference metadata may be searched. For example, a data search application may be used to search inference metadata stored in the metadata store at block 1012.

At block 1016, inference metadata may be visualized. For example, a data visualization application may be used to present and analyze aggregate inference metadata stored in the metadata store at block 1012 and/or subsets of inference metadata returned by a search at block 1014.

At block 1018, aggregate application of inference metadata may be analyzed. For example, search, visualization, and additional analytics tools may be directed at aggregate inference metadata and enable research, reporting, and integration with other business systems and data analytics.

At block 1020, a retraining request for the model trainer to initiate retraining using a new training data set may be initiated. For example, the deployment manager may generate a retraining request identifying the new data element(s) and/or new data types to be used for retraining the computational model.

At block 1022, the retraining request may be sent to the model trainer and/or data preparer. For example, the deployment manager may send the retraining request with the storage locations in primary storage where the new data elements may be accessed for the next training data set.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
  a processor;
  a memory;
  a primary storage system configured to store a training data set and a validation data set;
  a data ingester configured to receive raw data for processing through a computational model;
  a model trainer configured to:
    apply an artificial intelligence framework to the training data set in the primary storage system to generate a model instance of the computational model;

apply the validation data set to measure a reliability value of the model instance;
initiate, responsive to the reliability value not meeting a model validity threshold, retraining of the computational model; and
store, responsive to the reliability value meeting the model validity threshold, the model instance of the computational model in the primary storage system;
a model server configured to deploy the model instance of the computational model for use by a client system; and
a notifier configured to:
determine a new data element received by the data ingester; and
initiate, in parallel with the primary storage system storing the new data element, the model server to evaluate the new data element using the model instance of the computational model.

2. The system of claim 1, further comprising:
a graphical processing unit, wherein the model trainer is instantiated in the graphical processing unit for operation on the training data set in the primary storage system.

3. The system of claim 1, further comprising:
a data preparer configured to:
receive the raw data from the data ingester;
prepare the training data set from aggregate raw data; and
store the training data set to the primary storage system.

4. The system of claim 1, wherein the model trainer is further configured to:
determine an addressable storage location in the primary storage system configured to store the training data set; and
select, using metadata for a plurality of training data elements stored in the addressable storage location, the training data set from the addressable storage location.

5. The system of claim 1, wherein the primary storage system is further configured to store aggregate raw data.

6. The system of claim 1, further comprising:
a secondary storage system configured to archive archival model instances, wherein:
the model trainer is further configured to generate a plurality of model instances over time; and
the primary storage system is further configured to:
store active model instances for use by the model server; and
send archival model instances and related training data sets to the secondary storage system.

7. The system of claim 1, further comprising:
an inference evaluator configured to:
evaluate an inference score for the new data element, wherein the model server is further configured to determine the inference score based on the model instance of the computational model; and
initiate, responsive to the inference score not meeting the model validity threshold, retraining by the model trainer using a new training data set that includes the new data element.

8. The system of claim 7, wherein:
the model server is further configured to generate metadata for the new data element based on the model instance of the computational model; and
the inference evaluator is further configured to initiate, responsive to the inference score meeting the model validity threshold, post-processing of the metadata.

9. The system of claim 8, further comprising:
a metadata store configured to aggregate the metadata generated by the model server; and
at least one application configured to use the metadata store to analyze aggregate application of the computational model.

10. The system of claim 1, wherein:
the primary storage system is configured as a cloud storage system including rack-scale all-flash storage;
the data ingester is further configured to store the raw data into at least one data object stored in the cloud storage system; and
the notifier is configured as a service running on the cloud storage system.

11. A method, comprising:
receiving, by a primary storage system, operations on a training data set from a model trainer;
sending, by the primary storage system, a model instance of a computational model to a model server;
determining that a new data element is received by a data ingester;
initiating, in parallel with the primary storage system storing the new data element, the model server to evaluate the new data element using the model instance of the computational model;
determining, by the model server, an inference score based on the model instance of the computational model;
evaluating the inference score for the new data element; and
initiating, responsive to the inference score not meeting a model validity threshold, retraining by the model trainer using a new training data set that includes the new data element.

12. The method of claim 11, wherein:
the model trainer is instantiated in a graphical processing unit for generating the model instance using the training data set; and
the training data set is stored in the primary storage system.

13. The method of claim 11, further comprising:
receiving, by a data preparer, raw data from the data ingester;
preparing, by the data preparer, the training data set from aggregate raw data; and
storing, in the primary storage system, the training data set.

14. The method of claim 11, further comprising:
applying, by the model trainer, an artificial intelligence framework to the training data set;
generating, by the model trainer, the model instance of the computational model;
applying, by the model trainer, a validation data set stored in the primary storage system to measure a reliability value of the model instance;
initiating, responsive to the reliability value not meeting the model validity threshold, retraining of the computational model; and
storing, responsive to the reliability value meeting the model validity threshold, the model instance of the computational model in the primary storage system.

15. The method of claim 11, further comprising:
storing, in the primary storage system, aggregate raw data from the data ingester.

16. The method of claim 11, further comprising:
receiving, from the model trainer, a plurality of model instances over time;

storing, in the primary storage system, active model instances for use by the model server; and sending, by the primary storage system, archival model instances and related training data sets to a secondary storage system.

17. The method of claim 11, further comprising:

determining, responsive to the inference score not meeting the model validity threshold, the new training data set that includes the new data element;

applying, by the model trainer and responsive to initiating retraining, an artificial intelligence framework to the new training data set;

generating, by the model trainer and based on the new training data set, a new model instance of the computational model; and storing the new model instance of the computational model in the primary storage system.

18. The method of claim 17, further comprising:

generating, by the model server, metadata for the new data element based on the model instance of the computational model; and initiating, responsive to the inference score meeting the model validity threshold, post-processing of the metadata.

19. The method of claim 18, further comprising:

aggregating the metadata generated by the model server in a metadata store; and using the metadata store to analyze aggregate application of the computational model.

20. A system comprising:

a processor;

a memory;

a primary storage system configured to store:
 raw data;
 a training data set; and
 a model instance of a computational model;

means for receiving the raw data for processing through the computational model;

means for generating the model instance of the computational model based on the training data set;

means for deploying the model instance of the computational model for use by a client system;

means for determining a new data element is received for the primary storage system;

means for initiating, in parallel with the primary storage system storing the new data element, the means for deploying the model instance to evaluate the new data element using the model instance of the computational model;

means for determining an inference score based on the model instance of the computational model;

means for evaluating the inference score for the new data element; and means for initiating, responsive to the inference score not meeting a model validity threshold, retraining of the computational model using a new training data set that includes the new data element.

* * * * *